United States Patent
Iida

(10) Patent No.: US 10,025,278 B2
(45) Date of Patent: Jul. 17, 2018

(54) INFORMATION PROCESSING APPARATUS, INFORMATION PROCESSING METHOD, AND PROGRAM FOR CONTROLLING THE TEMPERATURE OF AN IMAGE DISPLAY APPARATUS

(71) Applicant: Sony Corporation, Minato-ku (JP)

(72) Inventor: Michihiko Iida, Kanagawa (JP)

(73) Assignee: SONY CORPORATION, Tokyo (JP)

(*) Notice: Subject to any disclaimer, the term of this patent is extended or adjusted under 35 U.S.C. 154(b) by 753 days.

(21) Appl. No.: 14/492,451

(22) Filed: Sep. 22, 2014

(65) Prior Publication Data
US 2015/0120079 A1    Apr. 30, 2015

(30) Foreign Application Priority Data
Oct. 24, 2013   (JP) ................... 2013-221048

(51) Int. Cl.
G05D 23/19   (2006.01)
G05B 15/00   (2006.01)

(52) U.S. Cl.
CPC ......... G05B 15/00 (2013.01); G05D 23/1917 (2013.01)

(58) Field of Classification Search
CPC .... G05D 23/19; G05D 23/00; G05D 23/1333; G05B 15/00
USPC ....................................................... 700/300
See application file for complete search history.

(56) References Cited

U.S. PATENT DOCUMENTS

| | | | | |
|---|---|---|---|---|
| 4,813,474 A * | 3/1989 | Umezu | ............. | F24F 11/08 165/228 |
| 4,850,198 A * | 7/1989 | Helt | ............. | F24F 11/08 62/157 |
| 4,858,824 A * | 8/1989 | Matsuda | ............. | F24F 11/0009 165/287 |
| 6,896,404 B2 * | 5/2005 | Seki | ............. | G05B 13/024 374/29 |
| 7,735,744 B2 * | 6/2010 | Eisenhour | ............. | B60H 1/00735 165/202 |
| 8,484,990 B2 * | 7/2013 | Ballet | ............. | F25B 1/10 62/181 |

(Continued)

FOREIGN PATENT DOCUMENTS

| | | | | |
|---|---|---|---|---|
| JP | 2003195952 | * | 7/2003 | ............. G05D 23/00 |
| KR | 10-2010-0028353 | * | 3/2010 | ............. G05D 23/19 |

*Primary Examiner* — Miranda M Huang
*Assistant Examiner* — Olvin Lopez Alvarez
(74) *Attorney, Agent, or Firm* — Oblon, McClelland, Maier & Neustadt, L.L.P.

(57) ABSTRACT

An information processing apparatus includes an input unit, an output unit, a change amount determination unit, and an instruction unit. The input unit is configured to input a measured temperature that is a measured value of a temperature of a measurement point. The output unit is configured to output a manipulated variable to a temperature control mechanism configured to control the temperature of the measurement point to be a set temperature, the manipulated variable being used for controlling the set temperature. The change amount determination unit is configured to determine an amount of temporal change of the input measured temperature. The instruction unit is configured to instruct the output unit to output a unit manipulated variable with a predetermined manipulated variable as a unit, based on a determination by the change amount determination unit.

16 Claims, 12 Drawing Sheets

(56) References Cited

U.S. PATENT DOCUMENTS

| | | | |
|---|---|---|---|
| 2003/0015972 A1* | 1/2003 | Suzuki | H05B 41/2881 315/291 |
| 2003/0118074 A1* | 6/2003 | Seki | G05B 11/42 374/29 |
| 2006/0120084 A1* | 6/2006 | Sueoka | G03B 21/16 362/294 |
| 2006/0260334 A1* | 11/2006 | Carey | F24F 3/1405 62/176.6 |
| 2007/0180851 A1* | 8/2007 | Fujiyoshi | F24F 3/1411 62/480 |
| 2007/0182940 A1* | 8/2007 | Asai | G03B 3/00 353/101 |
| 2007/0291238 A1* | 12/2007 | Yanagisawa | G03B 21/16 353/119 |
| 2008/0030689 A1* | 2/2008 | Hsu | G03B 21/16 353/57 |
| 2009/0216379 A1* | 8/2009 | Smith | F24F 11/0012 700/275 |
| 2010/0235013 A1* | 9/2010 | Suzuki | F25B 49/022 700/300 |
| 2010/0245780 A1* | 9/2010 | Abe | G03B 21/14 353/85 |
| 2011/0032488 A1* | 2/2011 | Abe | G03B 21/14 353/54 |
| 2015/0330841 A1* | 11/2015 | Kern | G01K 3/10 700/275 |

* cited by examiner

INFORMATION PROCESSING APPARATUS, INFORMATION PROCESSING METHOD, AND PROGRAM FOR CONTROLLING THE TEMPERATURE OF AN IMAGE DISPLAY APPARATUS

CROSS REFERENCE TO RELATED APPLICATIONS

This application claims the benefit of Japanese Priority Patent Application JP 2013-221048 filed Oct. 24, 2013, the entire contents of which are incorporated herein by reference.

BACKGROUND

The present disclosure relates to an information processing apparatus, an information processing method, a program, and an image display apparatus that control a temperature regulating apparatus such as a chiller.

Apparatuses for controlling temperatures of various apparatuses, devices, and the like have been used in the past. For example, Japanese Patent Application Laid-open No. 2003-195952 describes a chiller as a temperature regulating apparatus for controlling a temperature of a susceptor on which a semiconductor wafer is placed. As shown in FIG. 2 of Japanese Patent Application Laid-open No. 2003-195952, a heat medium made of water or ethylene glycol is discharged from a chiller 1 in a state where its temperature is managed. The heat medium is supplied to circulate in a susceptor 5 through a pipe 2. Heat generated in the susceptor 5 is absorbed by the heat medium, and thus the susceptor 5 is cooled. The high-temperature heat medium that has absorbed the heat is cooled by a cooler 6 in the chiller 1. The heat medium is circulated in such a manner, and thus the temperature of the susceptor 5 is controlled (see Japanese Patent Application Laid-open No. 2003-195952, paragraphs [0015], [0016], etc.).

SUMMARY

A technique of stably controlling a temperature control apparatus such as the chiller described above is expected to be provided.

In view of the circumstances as described above, it is desirable to provide an information processing apparatus, an information processing method, a program, and an image display apparatus that are capable of stably controlling a temperature control mechanism.

According to an embodiment of the present disclosure, there is provided an information processing apparatus including an input unit, an output unit, a change amount determination unit, and an instruction unit.

The input unit is configured to input a measured temperature that is a measured value of a temperature of a measurement point.

The output unit is configured to output a manipulated variable to a temperature control mechanism configured to control the temperature of the measurement point to be a set temperature, the manipulated variable being used for controlling the set temperature.

The change amount determination unit is configured to determine an amount of temporal change of the input measured temperature.

The instruction unit is configured to instruct the output unit to output a unit manipulated variable with a predetermined manipulated variable as a unit, based on a determination by the change amount determination unit.

In the information processing apparatus, the amount of temporal change of the measured temperature of the measurement point is determined. Based on such a result of the determination, an instruction to output the manipulated variable by the output unit is given. At that time, an instruction to output the unit manipulated variable with a predetermined manipulated variable as a unit is given. This allows an output for each unit manipulated variable to be executed for the temperature control mechanism whose operation is in a settled state. As a result, the temperature control mechanism can be stably controlled.

The change amount determination unit may be configured to determine whether the amount of temporal change falls within a predetermined range. In this case, the instruction unit may be configured to give an instruction to output the unit manipulated variable when it is determined that the amount of temporal change falls within the predetermined range.

This allows an output for each unit manipulated variable to be executed for the temperature control mechanism whose operation is in a settled state.

The information processing apparatus may further include a comparison unit configured to compare the measured temperature with a target temperature. In this case, the instruction unit may be configured to give an instruction to output a decreasing unit manipulated variable for decreasing the set temperature when the measured temperature is higher than the target temperature, and to give an instruction to output an increasing unit manipulated variable for increasing the set temperature when the measured temperature is lower than the target temperature.

In such a manner, the unit manipulated variable is output, and thus the temperature of the measurement point can be properly controlled.

The information processing apparatus may further include a target determination unit configured to determine whether the measured temperature falls within a first target temperature range with the target temperature as a reference. In this case, the instruction unit may be configured to give an instruction to output the unit manipulated variable when it is determined that the measured temperature does not fall within the first target temperature range.

With this configuration, the temperature control mechanism can be stably controlled.

The information processing apparatus may further include a storage unit configured to store a first unit manipulated variable and a second unit manipulated variable larger than the first unit manipulated variable. In this case, the target determination unit may be configured to determine whether the measured temperature falls within a second target temperature range with the target temperature as a reference, the second target temperature range being larger than the first target temperature range. Further, the instruction unit may be configured to give an instruction to output the first unit manipulated variable when it is determined that the measured temperature does not fall within the first target temperature range and falls within the second target temperature range, and to give an instruction to output the second unit manipulated variable when it is determined that the measured temperature does not fall within the first target temperature range and does not fall within the second target temperature range.

With this configuration, the temperature of the measurement point can be effectively controlled to be the target temperature.

The information processing apparatus may further include an increase and decrease determination unit configured to determine a temporal increase and decrease of the measured temperature. In this case, the instruction unit may be configured to give an instruction to output the decreasing unit manipulated variable when the measured temperature increases with time in a state of being higher than the target temperature, and to give an instruction to output the increasing unit manipulated variable when the measured temperature decreases with time in a state of being lower than the set temperature.

With this configuration, the temperature of the measurement point can be prevented from being largely different from the set temperature.

The instruction unit may be configured to give no instruction to output the unit manipulated variable before a predetermined period of time elapses after the temperature control mechanism starts to operate.

With this configuration, at the start of the operation, the output for each unit manipulated variable can be executed after the operation of the temperature control mechanism is stabilized.

The measurement point may be set at a portion having a thermal correlation with an object to be temperature-controlled.

With this configuration, the temperature of the object can be controlled.

The measurement point may be set at one portion of the object.

With this configuration, the temperature of the object can be controlled.

The temperature control mechanism may include a heat medium capable of exchanging heat with the object, and a chiller configured to control a temperature of the heat medium. In this case, the output unit may be configured to output the manipulated variable to the chiller.

In such a manner, the chiller may be used. According to the embodiment of the present disclosure, the chiller can be stably controlled.

The information processing apparatus may further include: a start controller configured to control a start of an operation of the object; and a start determination unit configured to determine whether the measured temperature falls within a start temperature range that is a reference of the start of the operation of the object. In this case, the start controller may be configured to start the operation of the object when it is determined that the measured temperature falls within the start temperature range.

This can prevent a problem resulting from a temperature rise at the start of the operation from occurring.

The object may be capable of operating at a predetermined output. In this case, the start controller may be configured to start the operation of the object in a stepwise manner, to increase an output toward the predetermined output in the stepwise manner.

This can prevent a problem resulting from a temperature rise at the start of the operation from occurring.

The information processing apparatus may further include: a stop controller configured to control a stop of an operation of the object; and a stop determination unit configured to determine whether the measured temperature falls within a stop temperature range that is a reference of the stop of the operation of the object. In such a case, the stop controller may be configured to stop the operation of the object when it is determined that the measured temperature falls within the stop temperature range.

This can prevent a problem resulting from a temperature drop at the stop of the operation from occurring.

The stop controller may be configured to stop the operation of the object in a stepwise manner, to reduce an output in the stepwise manner.

This can prevent a problem resulting from a temperature drop at the stop of the operation from occurring.

The input unit may be configured to input the measured temperature that is measured at predetermined sampling intervals.

According to another embodiment of the present disclosure, there is provided an information processing method, including: by a computer capable of outputting a manipulated variable to a temperature control mechanism configured to control a temperature of a measurement point to be a set temperature, the manipulated variable being used for controlling the set temperature, inputting a measured temperature that is a measured value of the temperature of the measurement point; determining an amount of temporal change of the input measured temperature; and outputting a unit manipulated variable with a predetermined manipulated variable as a unit, to the temperature control mechanism, based on a determination of the amount of temporal change.

According to another embodiment of the present disclosure, there is provided a program causing a computer, the computer being capable of outputting a manipulated variable to a temperature control mechanism configured to control a temperature of a measurement point to be a set temperature, the manipulated variable being used for controlling the set temperature, to execute: inputting a measured temperature that is a measured value of the temperature of the measurement point; determining an amount of temporal change of the input measured temperature; and outputting a unit manipulated variable with a predetermined manipulated variable as a unit, to the temperature control mechanism, based on a determination of the amount of temporal change.

According to another embodiment of the present disclosure, there is provided an image display apparatus including an image display unit, a measurement unit, an input unit, an output unit, a determination unit, and an instruction unit.

The image display unit includes a laser light source.

The measurement unit is configured to measure a temperature of a measurement point that is set at a portion having a thermal correlation with the laser light source.

The input unit is configured to input a measured temperature that is a measured value by the measurement unit.

The output unit is configured to output a manipulated variable to a temperature control mechanism configured to control the temperature of the measurement point to be a set temperature, the manipulated variable being used for controlling the set temperature.

The determination unit is configured to determine an amount of temporal change of the input measured temperature.

The instruction unit is configured to instruct the output unit to output a unit manipulated variable with a predetermined manipulated variable as a unit, based on a determination by the determination unit.

As described above, according to the present disclosure, it is possible to stably control the temperature control mechanism. It should be noted that the effects disclosed herein are not necessarily limited and any one of the effects disclosed herein may be produced.

These and other objects, features and advantages of the present disclosure will become more apparent in light of the following detailed description of best mode embodiments thereof, as illustrated in the accompanying drawings.

DETAILED DESCRIPTION OF EMBODIMENTS

Hereinafter, embodiments of the present disclosure will be described with reference to the drawings.

First Embodiment

[Configuration of Information Processing Apparatus]

Figure 1:
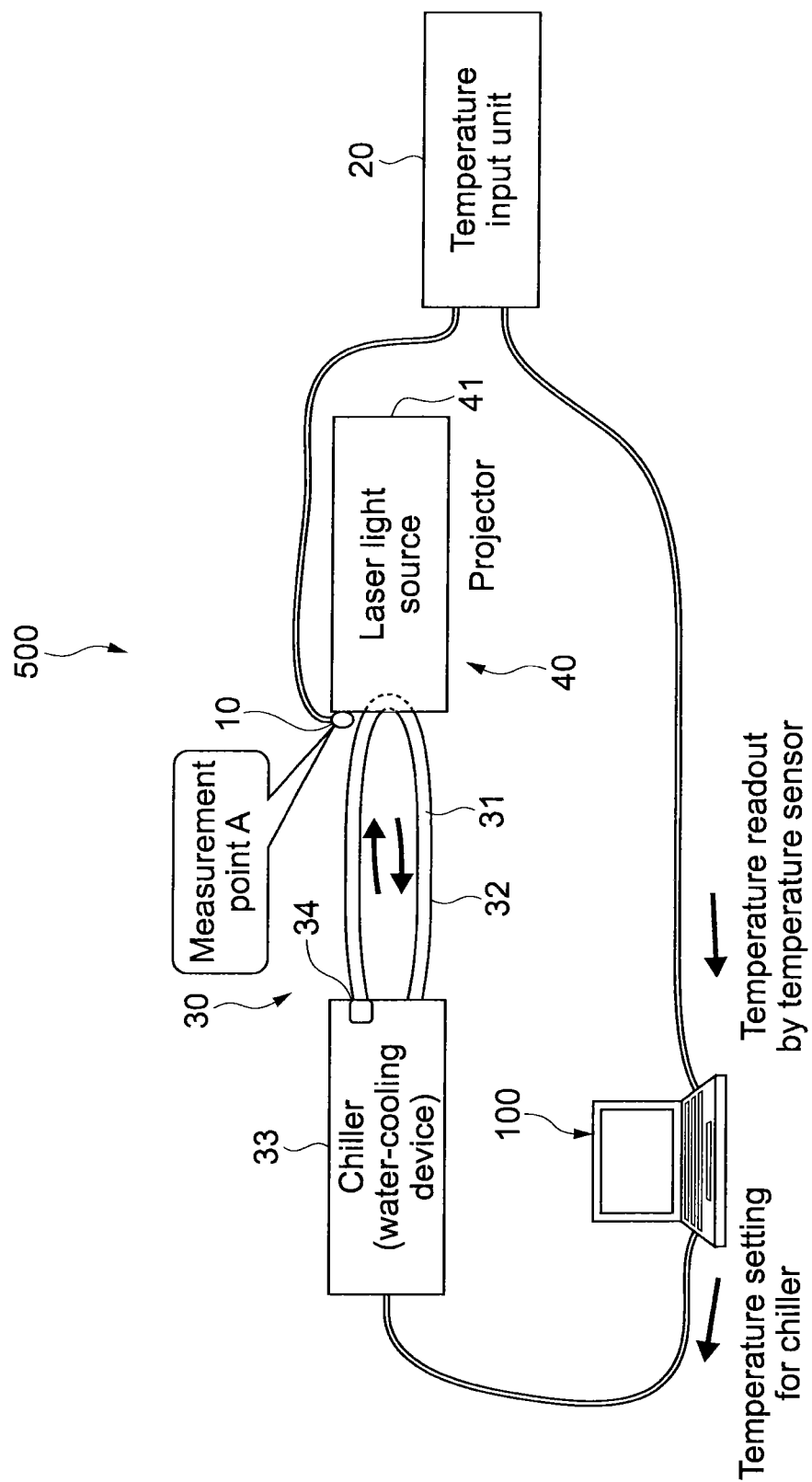
FIG. 1 is a schematic diagram showing a configuration example of a temperature control system according to a first embodiment.

FIG. 1 is a schematic diagram showing a configuration example of a temperature control system according to a first embodiment of the present disclosure. A temperature control system 500 includes an information processing apparatus 100 according to an embodiment of the present disclosure, a temperature sensor 10, a temperature input unit 20, a temperature control mechanism 30, and a projector 40 to be temperature-controlled.

A computer such as a PC (Personal Computer) is used as the information processing apparatus 100. The information processing apparatus 100 controls the temperature control mechanism 30 based on a temperature of a measurement point A, which is measured by the temperature sensor 10. The information processing apparatus 100 will be described later in detail. It should be noted that another computer other than the PC may be used as the information processing apparatus 100.

The temperature sensor 10 is disposed at the measurement point A and measures a temperature of the measurement point A. The configuration of the temperature sensor 10 is not limited, and for example, a thermocouple, a platinum temperature sensing element, or a thermistor is used. Another temperature sensor may be used.

The temperature input unit 20 converts an analog signal, which is output from the temperature sensor 10, into a digital signal. For example, the analog signal supplied from the temperature sensor 10 is amplified by a pre-amplifier and converted into a digital signal by an AD (Analog/Digital) converter. Other signal processing may be executed. The digital signal that indicates the measured temperature is transmitted to the information processing apparatus 100.

The configuration of the temperature input unit 20 is not limited. Further, connection methods among the temperature sensor 10, the temperature input unit 20, the information processing apparatus 100, and the temperature control mechanism 30 are also not limited. For example, the devices may be connected via a network such as a LAN (Local Area Network) or a WAN (Wide Area Network) or may be connected via cables connected to output terminals and input terminals of the respective devices, for example.

The temperature control mechanism 30 can control the temperature of the measurement point A to be a set temperature. For example, assuming that a set temperature is set to 20° C., the temperature control mechanism 30 executes temperature control such that the temperature of the measurement point A is changed to 20° C. In the case where the temperature of the measurement point A is higher than 20° C., the measurement point A is cooled. In the case where the temperature of the measurement point A is lower than 20° C., the measurement point A is heated.

In this embodiment, a manipulated variable is output from the information processing apparatus 100 to the temperature control mechanism 30 in order to control the set temperature. For example, in the state of the set temperature of 20° C., in the case where a manipulated variable of +5° C. is output, the set temperature is set to 25° C. Alternatively, in the case where a manipulated variable of −5° C. is output, the set temperature is set to 15° C. A minimum unit when the set temperature is changed is not limited, and is typically determined based on the configuration of the temperature control mechanism 30. For example, the set temperature may be changed with the minimum unit as 1° C. or as 0.1° C.

As will be described later in detail, in this embodiment, the information processing apparatus 100 outputs a unit manipulated variable with a predetermined manipulated variable as a unit. The unit manipulated variable is not limited as long as it is a manipulated variable with a fixed amount. For example, a minimum unit with which the set temperature can be changed is set as a unit manipulated variable. For example, in the case where the minimum unit is 0.1° C., ±0.1° C. may be set as the unit manipulated variable. Alternatively, ±0.5° C., which is five times as large as ±0.1° C., may be set as the unit manipulated variable.

In such a manner, in this embodiment, the unit manipulated variable with a fixed amount is output. So, the output of the unit manipulated variable, which means a change of the set temperature by the information processing apparatus 100, corresponds to the update of the manipulated variable. The information processing apparatus 100 updates the manipulated variable as appropriate, and thus the measurement point is controlled to have a target temperature.

As shown in FIG. 1, the temperature control mechanism 30 includes a heat medium (refrigerant) 31 capable of exchanging heat with an object to be temperature-controlled, a pipe 32 to be a flow channel of the heat medium 31, and a chiller 33 that controls the temperature of the heat medium 31. As the heat medium 31, for example, water, ethylene glycol, or the like is used. The type, length, shape, and the like of the pipe 32 are not limited. The pipe 32 is disposed as appropriate in or around the object to be temperature-controlled.

The chiller 33 controls the temperature of the heat medium 31 to be the set temperature. The information processing apparatus 100 outputs the unit manipulated variable described above to the chiller 33. The configuration of the chiller 33 is not limited, and any configuration such as a water cooling type, an air cooling type, a Peltier type, or a combination of those types may be used. A method of controlling the temperature of the heat medium 31 is also not limited, and feedback control such as PID (Proportional Integral Derivative Controller) control is executed based on the set temperature and the temperature of the heat medium discharged from the chiller 33 (discharge temperature), for example.

As shown in FIG. 1, in this embodiment, the projector 40 is disposed as an object to be temperature-controlled. The projector 40 includes an image display unit (not shown) including a laser light source 41. For example, three laser light sources 41 capable of outputting light of R, G, and B (red, green, and blue), respectively, are used. The laser light of R, G, and B are applied to three light modulation devices (for example, liquid crystal light valves) prepared for the laser light of the respective colors. Modulated light (images) of R, G, and B modulated by the light modulation devices are combined, and thus a color image is generated. The generated color image is projected onto a screen or the like. It should be noted that the configuration of the projector is not limited.

In this embodiment, with the temperature control system 500, the temperature of the laser light source 41 of the projector 40 is controlled. In the case where laser light in the range from 30,000 lumens to 60,000 lumens is output in order to achieve a high-luminance projector, the influence of heat generated from the laser light source 41 is large. In the present disclosure, the temperature of the laser light source 41 can be stably controlled, and thus high luminance of the projector 40, display of a high-luminance image, and the like are achieved.

As shown in FIG. 1, the pipe 32 to be a flow channel of the heat medium 31 is disposed as appropriate in or around the laser light source 41. A method of disposing the pipe 32 or the like is not limited, but for example, a portion for which highly accurate temperature control is necessary may be disposed on the upstream side of the pipe 32 (disposed closer to a discharge port 34 of the chiller 33). For example, in the case where the laser light sources 41 of the three colors of R, G, and B are used, the pipe 32 is disposed such that the laser light source 41 of a color for which the most highly accurate temperature control is necessary is disposed on the upstream side. Of the three laser light sources 41, the most highly accurate temperature control is necessary for a red laser light source in many cases, for example. Thus, for example, a red laser light source is disposed on the upstream side.

The laser light source 41 corresponds to the object to be temperature-controlled. The measurement point A is set at one portion of the laser light source 41. For example, an optional portion such as a substrate of the laser light source 41 or a frame that supports the laser light source 41 may be set as the measurement point A. Further, in the case where the laser light sources 41 of the three colors of R, G, and B are used, for example, the measurement point may be set for the laser light source 41 of one color such as red or for the laser light sources 41 of the respective colors.

Figure 2:
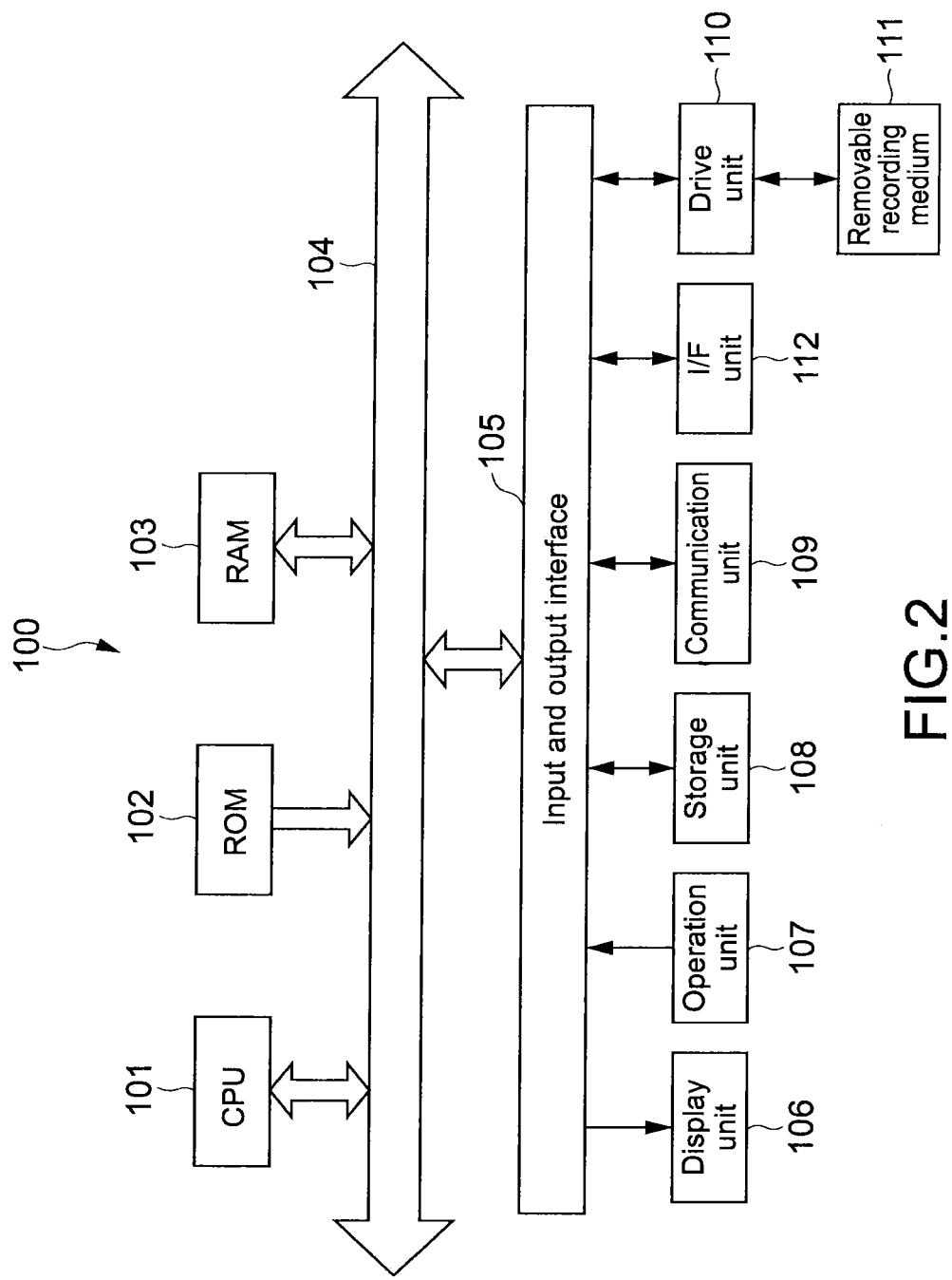
FIG. 2 is a block diagram showing a hardware configuration example of an information processing apparatus.

FIG. 2 is a block diagram showing a hardware configuration example of the information processing apparatus 100 according to this embodiment.

The information processing apparatus 100 includes a CPU (Central Processing Unit) 101, a ROM (Read Only Memory) 102, a RAM (Random Access Memory) 103, an input and output interface 105, and a bus 104 that connects those components to one another.

The input and output interface 105 is connected to a display unit 106, an operation unit 107, a storage unit 108, a communication unit 109, a drive unit 110, an I/F (interface) unit 112, and the like.

The display unit 106 is, for example, a display device using liquid crystal, EL (Electro-Luminescence), a CRT (Cathode Ray Tube), or the like. The operation unit 107 is, for example, a controller, a pointing device, a keyboard, a touch panel, or another operation apparatus. In the case where the operation unit 107 includes a touch panel, the touch panel may be integrated with the display unit 106.

The storage unit 108 is a non-volatile storage device and is, for example, an HDD (Hard Disk Drive), a flash memory, or another solid-state memory. The drive unit 110 is, for example, a device capable of driving a removable recording medium 111 such as an optical recording medium or a magnetic recording tape. In contrast to this, the storage unit 108 is used as a device that mainly drives non-removable recording media and is previously mounted into the information processing apparatus 100 in many cases.

The communication unit 109 is a modem, a router, or another communication device, which can be connected to a LAN, a WAN, or the like and is used for communicating with another device. The communication unit 109 may perform wired or wireless communication. The communication unit 109 is used separately from the information processing apparatus 100 in many cases.

The I/F unit 112 is an interface for connecting to another device or various cables, such as a USB (Universal Serial Bus) terminal, an HDMI (registered trademark) (High-Definition Multimedia Interface) terminal, or a network terminal. Information can be received from another device and a control signal and the like can be transmitted to another device via the I/F unit 112. It should be noted that the display unit 106, the operation unit 107, and the like may be connected to the information processing apparatus 100 via the I/F unit 112.

Information processing by the information processing apparatus 100 including the hardware configuration described above is achieved by cooperation of software stored in the storage unit 108, the ROM 102, or the like and hardware resources of the information processing apparatus 100. Specifically, such information processing is achieved by the CPU 101 loading a program, which configures the software and is stored in the storage unit 108, the ROM 102, or the like, to the RAM 103 and executing the program.

The program is installed in the information processing apparatus 100 via the recording medium 111, for example. Alternatively, the program may be installed in the information processing apparatus 100 via a global network or the like. Further, the program executed by the information processing apparatus 100 may be a program that is processed in time series, in parallel, or at a necessary timing such as when an invocation is performed.

Figure 3:
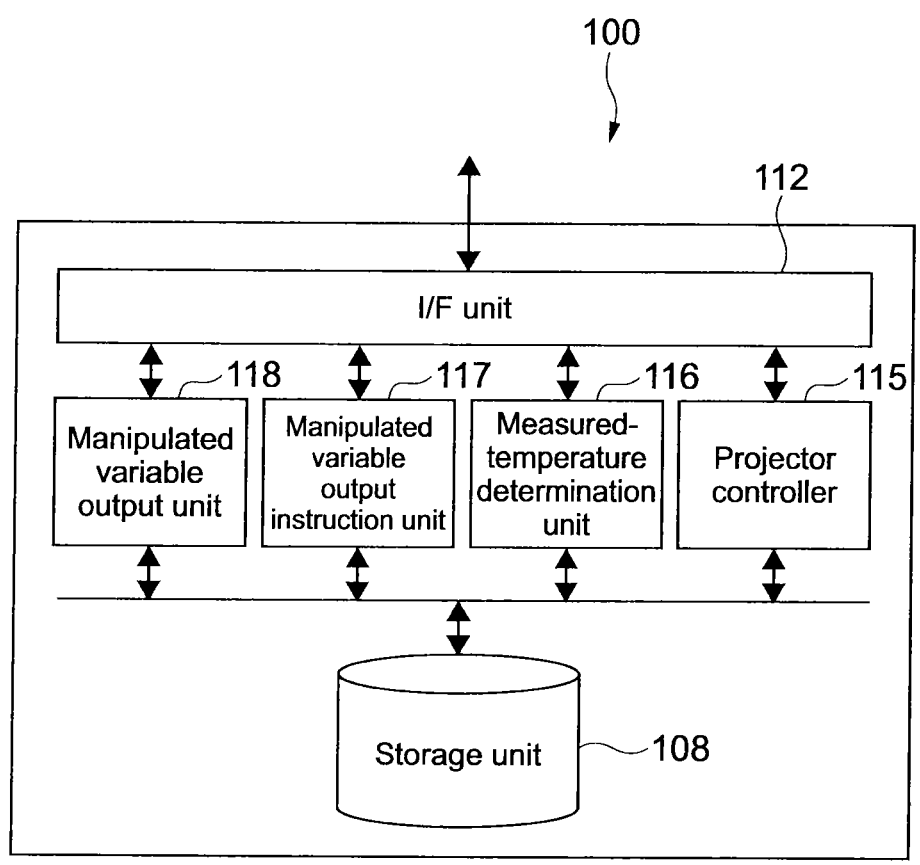
FIG. 3 is a block diagram showing a software configuration example of the information processing apparatus.

FIG. 3 is a block diagram showing a software configuration example of the information processing apparatus 100. The CPU 101 shown in FIG. 2 executes a predetermined program, and thus a projector controller 115, a measured-temperature determination unit 116, a manipulated variable output instruction unit 117, and a manipulated variable output unit 118 that serve as software blocks are achieved.

It should be noted that dedicated hardware may be used as appropriate in order to achieve each block.

The projector controller 115 can control the operation of the projector 40 by outputting a control signal to the projector 40. In this embodiment, the projector controller 115 controls the start and stop of the operation of the laser light source 41. Here, the start of the operation of the laser light source 41 means the output of the laser light. Further, the stop of the operation of the laser light source 41 means the stop of the output of the laser light. However, the present disclosure is not limited thereto.

The laser light source 41 can output the laser light at a predetermined output, that is, can operate at a predetermined output. The "predetermined output" means a predetermined emission amount, and the magnitude thereof corresponds to an emission amount necessary for image display, for example. Alternatively, the maximum emission amount may be set for the "predetermined output". Further, drive power to drive the laser light source may be handled as the "predetermined output".

The projector controller 115 can control the output, i.e., the emission amount, of the laser light. For example, the projector controller 115 can output the laser light in a stepwise manner such that the output increases in a stepwise manner toward the predetermined output described above. Further, the projector controller 115 can stop the output of the laser light in a stepwise manner such that the output decreases in a stepwise manner. In addition thereto, the projector controller 115 controls operations of the laser light source 41, an image generation unit, and other mechanisms of the projector 40. In this embodiment, the projector controller 115 achieves a start controller and a stop controller.

The measured-temperature determination unit 116 executes various determinations based on the measured temperature that has been measured by the temperature sensor 10 and transmitted by the temperature input unit 20. Information used for the determinations is read out from the storage unit 108 or the like as appropriate.

The manipulated variable output instruction unit 117 instructs the manipulated variable output unit 118 to output a unit manipulated variable based on the various determinations by the measured-temperature determination unit 116. The manipulated variable output instruction unit 117 functions as an instruction unit in this embodiment.

The manipulated variable output unit 118 outputs a manipulated variable for controlling the set temperature to the chiller 33 of the temperature control mechanism 30. As described above, the unit manipulated variable is output to the chiller 33 according to an instruction of the manipulated variable output instruction unit 117. The manipulated variable output unit 118 functions as an output unit in this embodiment.

In this embodiment, the measured-temperature determination unit 116, the manipulated variable output instruction unit 117, and the manipulated variable output unit 118 form a chiller controller. Further, the measured-temperature determination unit 116 and the manipulated variable output instruction unit 117 form a settled-state determination unit. The settled-state determination unit functions as a block to determine whether the operation of the chiller 33 is settled or not.

The present disclosure is not limited to such a configuration as a matter of course. To achieve an information processing method according to an embodiment of the present disclosure described herein, software and hardware may be formed as appropriate. The same holds true for a software configuration shown in FIG. 4.

Though not shown in FIG. 3, the information processing apparatus 100 includes a block to control the temperature input unit 20. A measured temperature is acquired according to an instruction or a request from this block and transmitted to the information processing apparatus 100.

Figure 4:
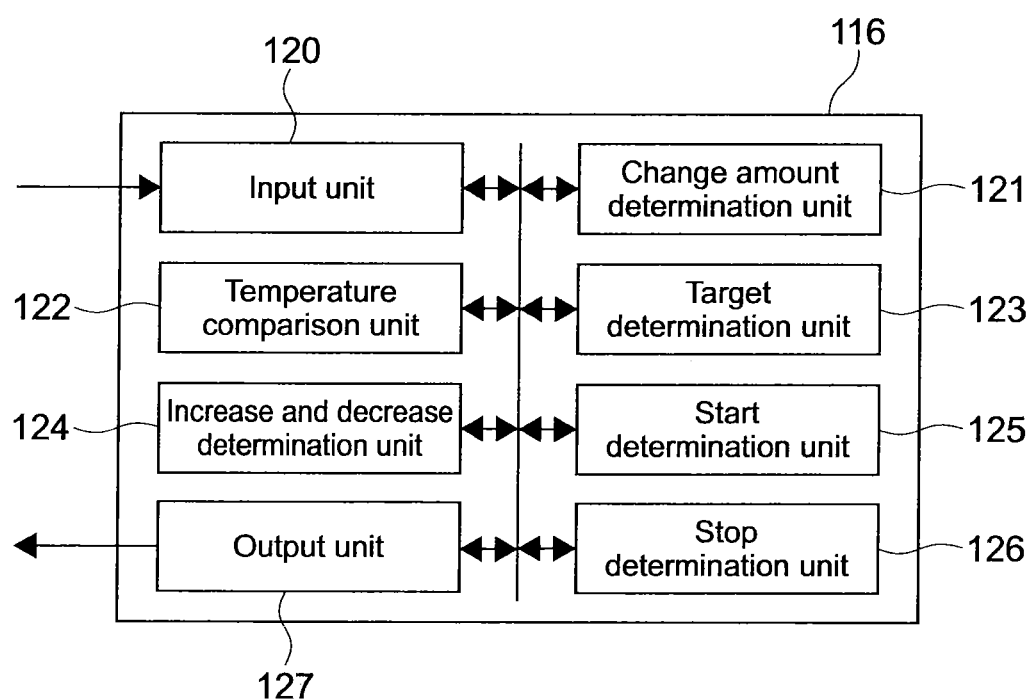
FIG. 4 is a block diagram showing a configuration example of a measured-temperature determination unit shown in FIG. 3.

FIG. 4 is a block diagram showing a configuration example of the measured-temperature determination unit 116. The measured-temperature determination unit 116 includes an input unit 120, a change amount determination unit 121, a temperature comparison unit 122, a target determination unit 123, an increase and decrease determination unit 124, a start determination unit 125, a stop determination unit 126, and an output unit 127.

The input unit 120 inputs the measured temperature. In this embodiment, the input unit 120 and the I/F unit 112 achieve an input unit with which the measured temperature as a measured value of the temperature of the measurement point A is input.

The change amount determination unit 121 determines the amount of temporal change of the input measured temperature. In this embodiment, the change amount determination unit 121 determines whether the amount of temporal change of the measured temperature falls within a predetermined range. Hereinafter, the predetermined range will be referred to as a settling determination range.

In this embodiment, the measured temperature that has been measured at predetermined sampling intervals is transmitted to the information processing apparatus 100. Typically, the amount of temporal change of the measured temperature is calculated based on a difference between a current measured temperature and the last measured temperature, which have been measured at predetermined sampling intervals. However, the present disclosure is not limited thereto and the amount of temporal change of the measured temperature may be calculated based on a difference between a past predetermined measured temperature and the current measured temperature.

Alternatively, the measured temperature may be input as continuous analog data. A temporal differentiation of the temperature may be calculated with use of a differentiating circuit or the like, and that value may be calculated as the amount of temporal change of the measured temperature.

The temperature comparison unit 122 compares the measured temperature with a target temperature and outputs a result of the comparison, that is, which of the temperatures is higher. The target temperature is a temperature to be controlled, for the temperature of the laser light source 41 that is an object to be temperature-controlled, i.e., for the temperature of the measurement point A. In addition, the measured temperature and another temperature such as the set temperature may be compared with each other. Further, temperatures different from the measured temperature may be compared with each other.

The target determination unit 123 determines whether the measured temperature falls within a target temperature range with the target temperature as a reference. In this embodiment, a first target temperature range and a second target temperature range that is larger than the first target temperature range are set as the target temperature ranges. The first target temperature range is a range included in the second target temperature range.

The target determination unit 123 determines the following three patterns:

the measured temperature falls within both the first and second target temperature ranges (if falling within the first target temperature, the measured temperature falls within both the ranges);

the measured temperature does not fall within the first target temperature range and falls within the second target temperature range; and the measured temperature does not fall within the first target temperature range and does not fall within the second target temperature range.

The increase and decrease determination unit 124 determines a temporal increase and decrease of the measured temperature. In other words, the increase and decrease determination unit 124 determines the following three patterns: a temporal increase of the measured temperature; a temporal decrease of the measured temperature; and no changes. In this embodiment, the last measured temperature and the current measured temperature, which have been measured at predetermined sampling intervals, are compared with each other, and thus a temporal increase and decrease of the measured temperature is determined.

In other words, in the case where the last measured temperature is higher in the two measured temperatures, it is determined that the measured temperature decreases with time. In the case where the current measured temperature is higher in the two measured temperatures, it is determined that the measured temperature increases with time. In the case where the two measured temperatures take the same value, it is determined that the measured temperature is not changed with time. A method of determining a temporal increase and decrease is not limited thereto and another method may be used.

The start determination unit 125 determines whether the measured temperature falls within a start temperature range. The start temperature range is a reference of the start of the operation of the object to be temperature-controlled. In this embodiment, the start determination unit 125 determines whether the measured temperature falls within a temperature range appropriate to the start of the operation of the laser light source 41. In other words, here, the temperature range appropriate to the start of the operation of the laser light source 41 corresponds to the start temperature range that is to be a reference of the start of the operation. However, the present disclosure is not limited to the above.

The stop determination unit 126 determines whether the measured temperature falls within a stop temperature range. The stop temperature range is a reference of the stop of the operation of the object to be temperature-controlled. In this embodiment, the stop determination unit 126 determines whether the measured temperature falls within a temperature range appropriate to the stop of the operation of the laser light source 41. In other words, here, the temperature range appropriate to the stop of the operation of the laser light source 41 corresponds to the stop temperature range that is to be a reference of the stop of the operation. However, the present disclosure is not limited to the above. It should be noted that the start temperature range and the stop temperature range are stored in the storage unit 108, for example.

The output unit 127 outputs the determination results, the comparison result, and the like from the respective determination units and the temperature comparison unit 122. The determination results and the comparison result are output to the manipulated variable output instruction unit 117 and the like via the output unit 127.

Figure 5:
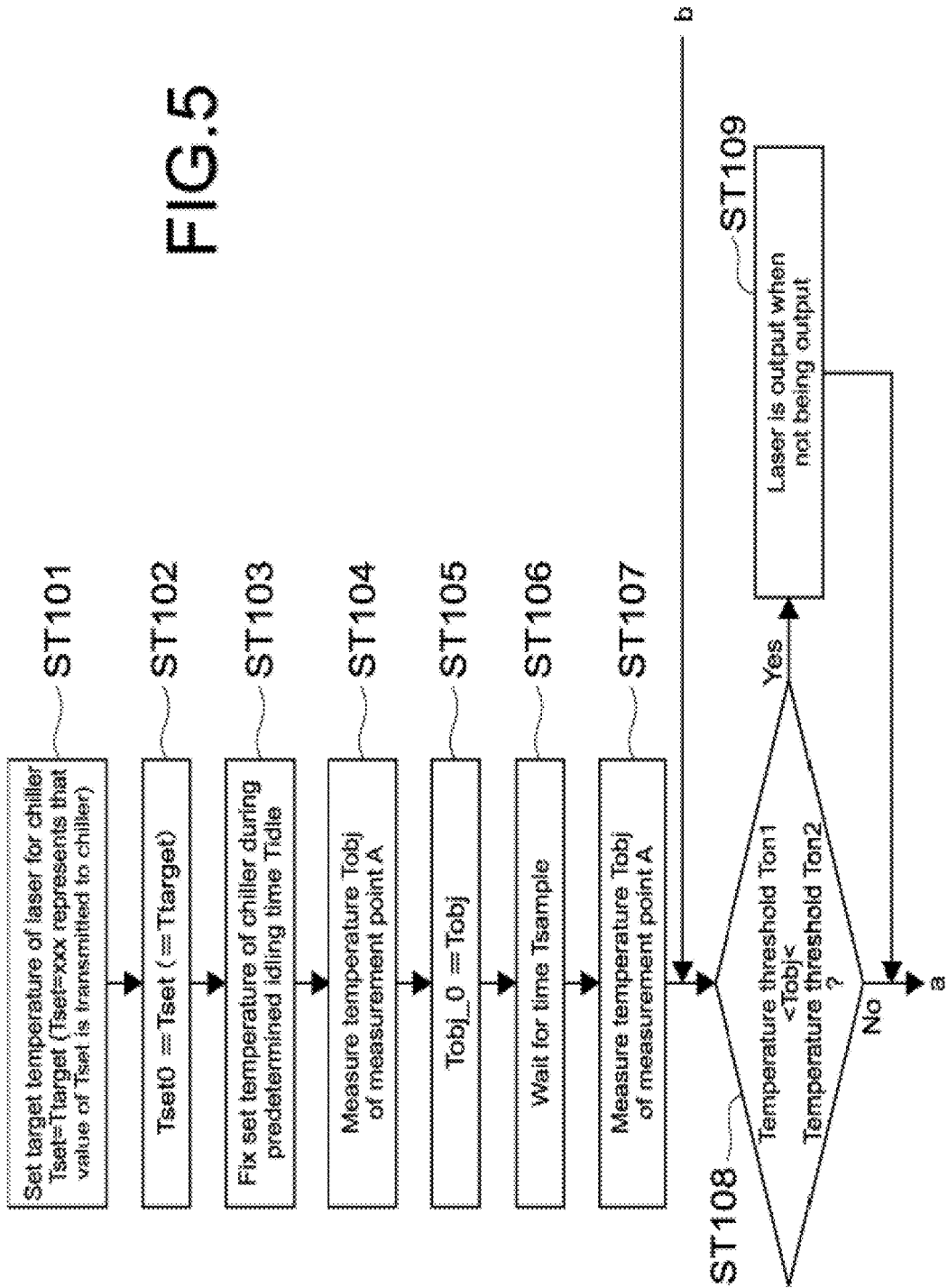
FIG. 5 is a flowchart showing an operation example of the information processing apparatus.
Figure 6:
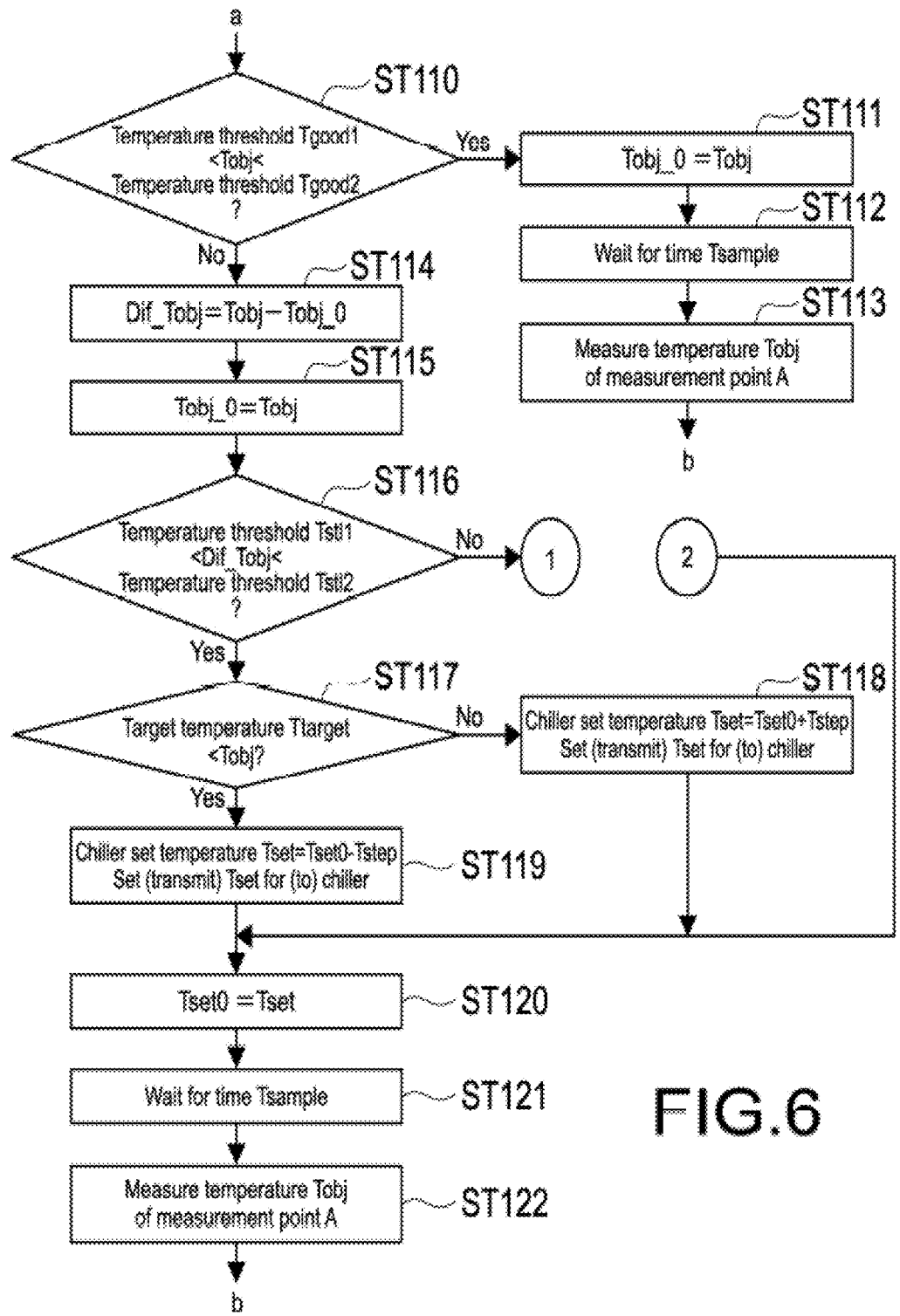
FIG. 6 is a flowchart showing an operation example of the information processing apparatus.
Figure 7:
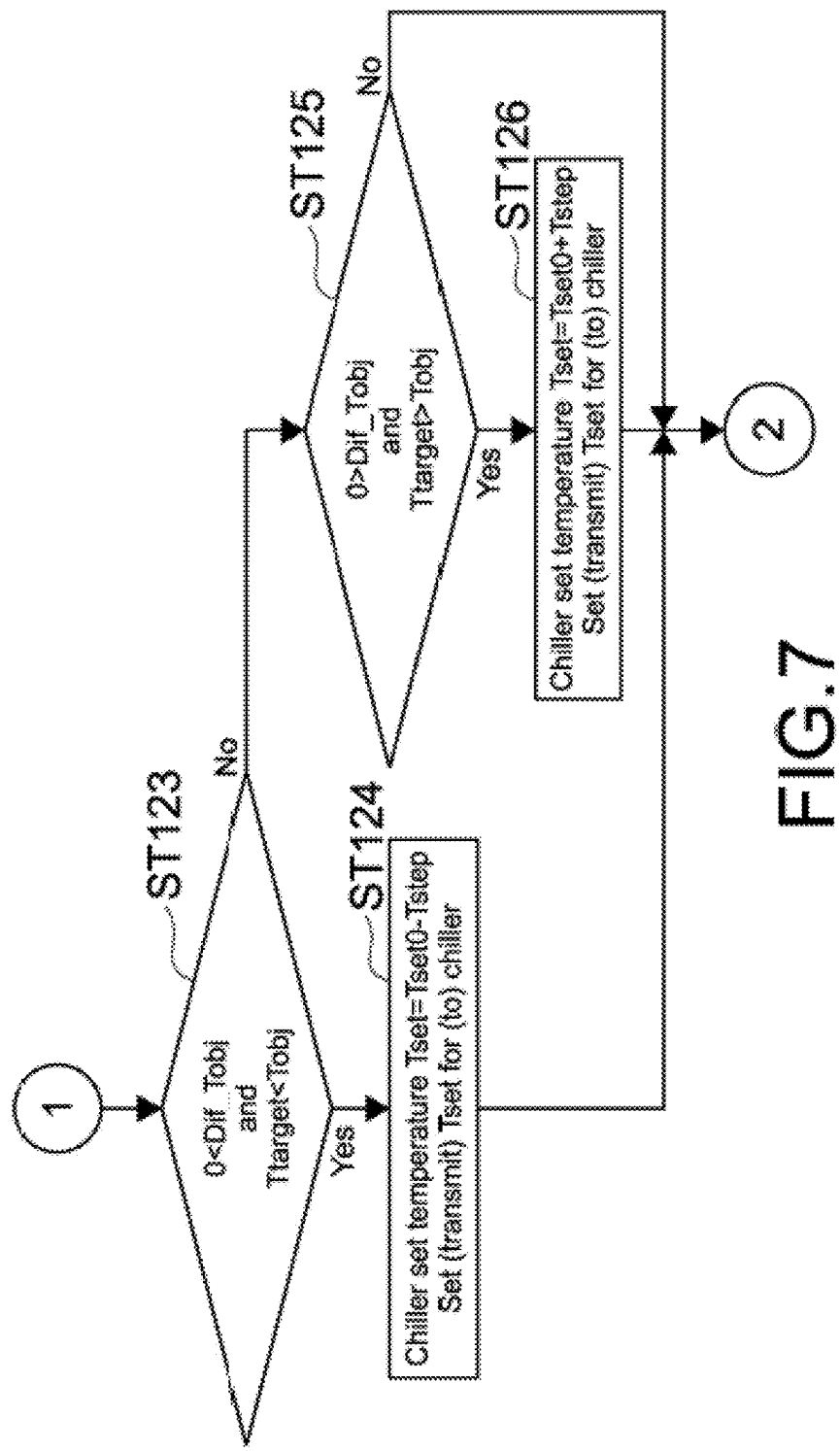
FIG. 7 is a flowchart showing an operation example of the information processing apparatus.
Figure 8:
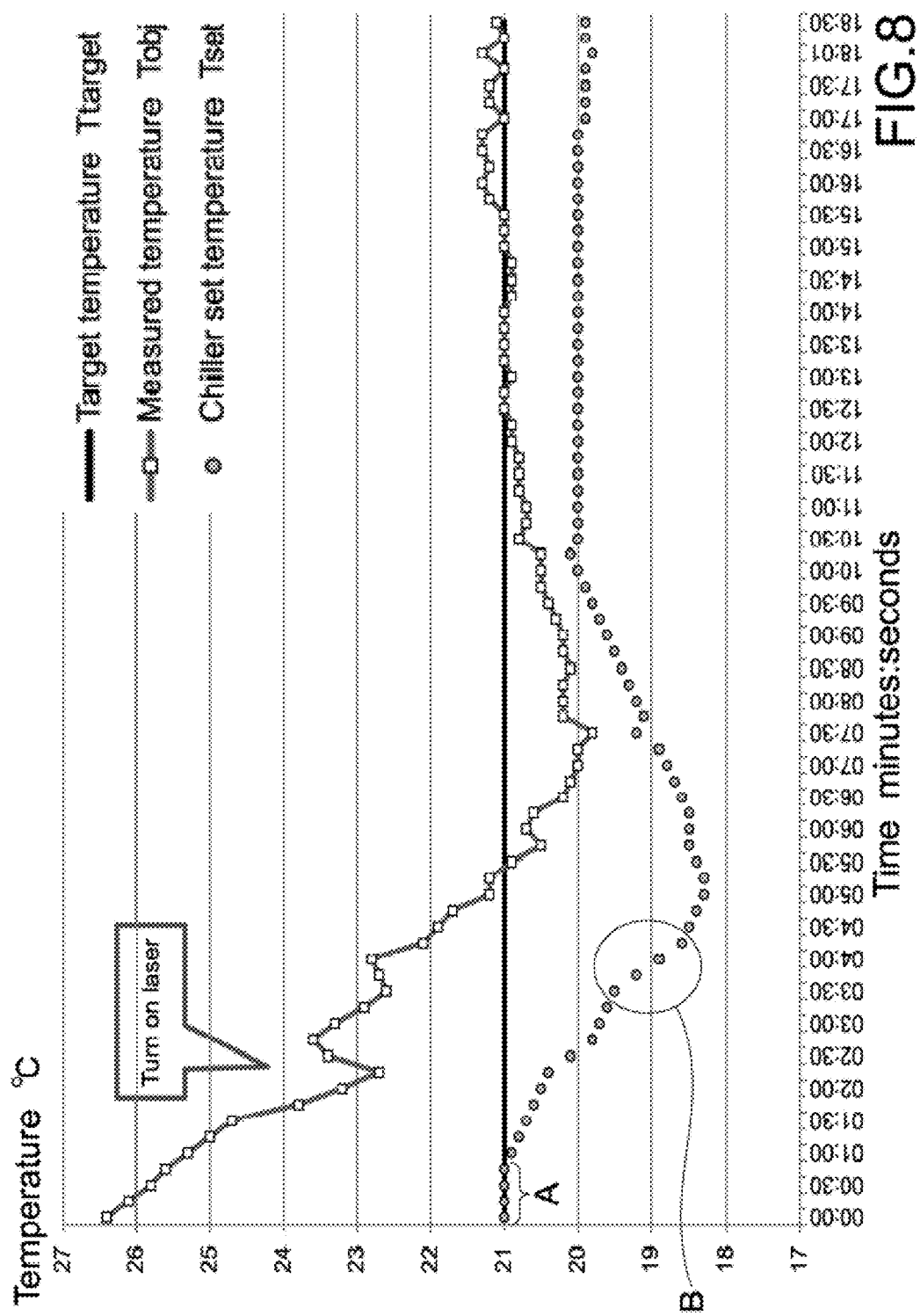
FIG. 8 is a graph showing values of a measured temperature and a set temperature of a chiller in accordance with time.

FIGS. 5 to 7 are flowcharts each showing an operation example of the information processing apparatus 100 in the temperature control system 500. FIG. 8 is a graph showing values of the measured temperature and the set temperature of the chiller 33 in accordance with time. The graph of FIG. 8 shows the measured temperature, which has been measured at the predetermined sampling intervals, and the set temperature, which has been updated in accordance with the measured temperature. Further, the graph of FIG. 8 shows the target temperature. In this embodiment, the target temperature is fixed to 21° C.

As shown in FIG. 5, first, the operation of the chiller 33 is started via the information processing apparatus 100. Subsequently, a set temperature Tset is set for the chiller 33 (Step 101). As shown in FIG. 8, in this initial setting, the set temperature Tset is set as a target temperature Ttarget (=21° C.) of the laser light source 41. As shown in FIG. 5, when Tset=xxx, it represents that the value of xxx is transmitted as the set temperature Tset to the chiller. In this case, Tset=Ttarget in Step 101.

Next, as a set temperature Tset0 that is set for the chiller 33 at the last minute (in the previous setting), the set temperature Tset that is set in Step 101 is set (Step 102). So, Tset0=Tset (=Ttarget). Information on Tset or Tset0 and other set information are stored in the storage unit 108 or the like as appropriate.

During a predetermined idling time Tidle, the set temperature Tset of the chiller 33 is fixed (Step 103). In this embodiment, in the idling time Tidle, the output of the unit manipulated variable by the manipulated variable output instruction unit 117 is stopped. Alternatively, the output of the unit manipulated variable by the manipulated variable output instruction unit 117 is invalidated. Alternatively, the set temperature Tset may be locked on the chiller 33 side.

The length of the idling time Tidle may be optionally set. A time in which the operation of the chiller 33 is determined to be stabilized at the start of the operation may be set as the idling time Tidle as appropriate.

In such a manner, in this embodiment, the instruction to output the unit manipulated variable is not given before the predetermined idling time Tidle elapses after the chiller 33 of the temperature control mechanism 30 starts operating. This allows the output of the unit manipulated variable to be executed at the start of the operation after the operation of the chiller 33 is stabilized. As a result, the chiller 33 can be stably controlled. It should be noted that in the graph of FIG. 8, a range denoted by reference symbol A corresponds to the idling time Tidle.

After the elapse of the idling time Tidle, a temperature Tobj of the measurement point A is measured (Step 104). The measured temperature Tobj is transmitted to the information processing apparatus 100. It should be noted that the measurement point A is also referred to as an observation point.

The measured temperature Tobj that has been measured in Step 104 is set as a measured temperature Tobj_0 set at the last minute (in the previous setting) (Step 105).

The operation is in a standby state in a sampling time Tsample (Step 106). As the sampling time Tsample, for example, about 10 seconds to 20 seconds are set. However, the length of the sampling time Tsample is not limited and an optional time may be set. The sampling time Tsample is set as appropriate based on a time that elapses before the operation of the chiller 33 enters a settled state. After the sampling time Tsample elapses, the temperature Tobj of the measurement point A is measured (Step 107).

The start determination unit 125 determines whether the measured temperature Tobj falls within the start temperature range appropriate to the start of the operation of the laser light source 41 (Step 108). A temperature threshold Ton1 and a temperature threshold Ton2 shown in Step 108 are a lower limit value and an upper limit value of the start temperature range, respectively.

After the operation of the laser light source 41 is started and the laser light is output, heat is generated from the laser light source 41. In the case where high-luminance laser light is output as described above, the amount of heat generation also increases. As a result, as shown in the graph of FIG. 8, the measured temperature Tobj instantaneously rises immediately after the start of the output of the laser light.

When the temperature of the laser light source 41 becomes too high at the output of the laser light, the load on laser elements increases and the lifetime of the laser light source 41 is shortened. The laser elements may be broken or surrounding members may be adversely affected. So, in this embodiment, the following start temperature range is set: if a temperature rise occurs at the start of the operation, the temperature becomes an allowable temperature of the laser light source 41.

A specific value of the start temperature range is not limited and may be set as appropriate in accordance with the characteristics of the laser light source 41 and the like. For example, a range from about 22° C. to 23° C. is set as the start temperature range. It should be noted that when only the upper limit value is set and the measured temperature Tobj falls below that upper limit value, it may be determined that this state is appropriate to the start of the output of the laser light.

In the case where the measured temperature Tobj falls within the start temperature range (Yes of Step 108), the projector controller 115 starts outputting the laser light (Step 109). In the case where the laser light is already output, Step 109 is skipped. The determination of the start determination unit 125 is executed in such a manner, and thus it is possible to prevent a problem resulting from the temperature rise at the start of the operation from occurring.

When it is determined that the measured temperature Tobj does not fall within the start temperature range (No of Step 108), the output of the laser light is not started (excluding the case where the laser light is already output), and the processing proceeds to Step 110 of FIG. 6.

In Step 110 of FIG. 6, the target determination unit 123 determines whether the measured temperature Tobj falls within the first target temperature range. A temperature threshold Tgood1 and a temperature threshold Tgood2 shown in Step 110 are a lower limit value and an upper limit value of the first target temperature range, respectively. The first target temperature range is a range that is determined to be sufficiently close to the target temperature. As the first target temperature range, a range of about 0.4° C. centering on the target temperature Ttarget is set. In other words, in the example shown in FIG. 8, with respect to the target temperature of 21° C., the temperature threshold Tgood1 is set to 20.6° C. and the temperature threshold Tgood2 is set to 21.4° C.

The present disclosure is not limited to such a range as a matter of course, and the first target temperature range may be set as appropriate. For example, a temperature range in which an oscillation wavelength of the laser light output from the laser light source 41 is not shifted is set as the first target temperature range. Typically, the first target temperature range is a range included in the start temperature range. However, the present disclosure is not limited to the above.

When it is determined that the measured temperature Tobj falls within the first target temperature range (Yes of Step 110), it is determined that the temperature control is achieved. Thus, the set temperature Tset of the chiller 33 is not updated, that is, the instruction to output the unit manipulated variable is not given.

The measured temperature Tobj measured in Step 107 is set as the measured temperature Tobj_0 that has been measured at the last minute (Step 111). The operation is in a standby state in the sampling time Tsample (Step 112) and the temperature Tobj of the measurement point A is measured (Step 113). Subsequently, the processing returns back to Step 108 of FIG. 5.

In such a manner, the first target temperature range is set and the determination of the measured temperature Tobj is executed. Thus, the operation of the chiller 33 can be stabilized at a temperature close to the target temperature Ttarget.

When it is determined that the measured temperature Tobj does not fall within the first target temperature range (No of Step 110), a difference Dif_Tobj between the measured temperature Tobj, which has been measured in Step 107, and the measured temperature Tobj_0, which has been measured in Step 105, is calculated as the amount of temporal change of the measured temperature Tobj (Step 114). Subsequently, the measured temperature Tobj, which has been measured in Step 107, is set as the measured temperature Tobj_0 measured at the last minute (Step 115).

The change amount determination unit 121 determines whether the measured temperature Tobj falls within the settling determination range or not (Step 116). A temperature threshold Tst11 and a temperature threshold Tst12 shown in Step 116 are a lower limit value and an upper limit value of the settling determination range, respectively. The settling determination range is a range for determining whether the operation of the chiller 33 is settled or not. The magnitude of the settling determination range is not limited, and a range in which the operation of the chiller 33 can be determined to be a settled state only needs to be set as appropriate based on the characteristics and the like of the chiller 33.

For example, the range of about 0.3° C. is set as the settling determination range. In this case, the temperature threshold Tst11 is set to −0.15° C., and the temperature threshold Tst12 is set to 0.15° C. The range is the difference between two measured temperatures and thus may be represented by using an absolute value. In other words, whether the following expression is satisfied or not may be determined: |Dif_Tobj|<Temperature threshold Tst1.

When it is determined that the difference Dif_Tobj indicating the amount of temporal change of the measured temperature Tobj falls within the settling determination range (Yes of Step 116), it is determined that the operation of the chiller 33 enters a settled state. Subsequently, the temperature comparison unit 122 compares the measured temperature Tobj with the target temperature Ttarget (Step 117). In the example shown in the graph of FIG. 8, it is determined in Step 117 whether the measured temperature Tobj is higher than 21° C. or not.

When it is determined that the measured temperature Tobj is lower than the target temperature Ttarget (No of Step 117), the set temperature Tset of the chiller 33 is increased by an amount corresponding to the unit manipulated variable (Step 118). Here, as the unit manipulated variable, 0.1° C. is set. In this case, the set temperature is increased to 21.1° C. In order to increase the set temperature Tset, the manipulated variable output instruction unit 117 gives an instruction to output the manipulated variable of +0.1° C. In other words, a manipulated variable including a reference symbol "+" is output. In this embodiment, the "+ unit manipulated variable" corresponds to an increasing unit manipulated variable for increasing the set temperature.

As shown in Step 118, in this embodiment, Tset (=21.1° C.), which is obtained by adding Tstep serving as the unit manipulated variable to Tset0 (=21° C.) set in Step 102, is transmitted to the chiller 33. In such a manner, a value added by an amount corresponding to the unit manipulated variable may be transmitted to the chiller 33 as a set value obtained after the update of the set temperature Tset. Alternatively, an instruction to increase the set temperature by an amount corresponding to the unit manipulated variable may be transmitted to the chiller 33. In the present disclosure, it is assumed that various instructions to increase the set temperature Tset of the chiller 33 by an amount corresponding to the unit manipulated variable, and the like are included in "the output of the unit manipulated variable". The same holds true for the case where the set temperature Tset is decreased.

When it is determined that the measured temperature Tobj is higher than the target temperature Ttarget (Yes of Step 117), the set temperature Tset of the chiller 33 is decreased by an amount corresponding to the unit manipulated variable (Step 119). So, the set temperature is decreased to 20.9° C. In order to decrease the set temperature Tset, the manipulated variable output instruction unit 117 gives an instruction to output the manipulated variable of −0.1° C. In other words, a manipulated variable including a reference symbol "−" is output. In this embodiment, the "− unit manipulated variable" corresponds to a decreasing unit manipulated variable for decreasing the set temperature.

As shown in Step 119, in this embodiment, Tset (=20.9° C.), which is obtained by subtracting Tstep serving as the unit manipulated variable from Tset0 (=21° C.), is transmitted to the chiller 33. Instead of this, an instruction to decrease the set temperature by an amount corresponding to the unit manipulated variable may be transmitted to the chiller 33.

When the update of the set temperature Tset is terminated, the set temperature Tset updated in Step 118 or 119 is set as the set temperature Tset0, which is set at the last minute (Step 120). The operation is in a standby state in the sampling time Tsample (Step 121) and the temperature Tobj of the measurement point A is measured (Step 122). Subsequently, the processing returns back to Step 108 of FIG. 5.

When it is determined in Step 116 of FIG. 6 that the difference Dif_Tobj indicating the amount of temporal change of the measured temperature Tobj does not fall within the settling determination range (No), that is, the operation of the chiller 33 is not stabilized, the processing shown in FIG. 7 is executed.

First, the increase and decrease determination unit 124 compares the measured temperature Tobj, which has been measured in Step 107, with the measured temperature Tobj_0, which has been set in Step 105, and determines a larger one. Specifically, whether the difference Dif_Tobj, which has been calculated in Step 114, is a positive value or a negative value is determined. In addition to this determination, the temperature comparison unit 122 compares the measured temperature Tobj with the target temperature Ttarget and determines a higher one (Step 123). It should be noted that in each Step, a result that is previously obtained by a comparison or determination may be used.

In other words, in Step 123, it is determined whether the measured temperature Tobj increases or not with time in a state of being higher than the target temperature Ttarget. In the case where a result of the determination is Yes, that is, the difference Dif_Tobj is a positive value and the measured temperature Tobj is higher than the target temperature Ttarget, the set temperature Tset of the chiller 33 is decreased by an amount corresponding to the unit manipulated variable (Step 124).

In the case where a result of the determination is No in Step 123, it is determined whether the measured temperature Tobj decreases or not with time in a state of being lower than the target temperature Ttarget. In other words, it is determined that the difference Dif_Tobj between the measured temperature Tobj and the measured temperature Tobj_0 is a negative value and the measured temperature Tobj is lower than the target temperature Ttarget (Step 125). In the case where a result of the determination is Yes, the set temperature Tset of the chiller 33 is increased by an amount corresponding to the unit manipulated variable (Step 126). Subsequently, the processing returns back to Step 120 of FIG. 6.

In such a manner, in this embodiment, when it is determined that the operation of the chiller 33 is not stabilized and the measured temperature Tobj fluctuates in a direction away from the target temperature Ttarget, the set temperature Tset of the chiller 33 is set to the opposite direction of the fluctuation. This can prevent the measured temperature Tobj from being an abnormal value.

Here, description will be given on the unit manipulated variable Tstep. In the above description, the value of 0.1° C. that has been set as the unit manipulated variable Tstep is stored in the storage unit 108 or the like, and the unit manipulated variable Tstep of 0.1° C. is output according to the instruction of the manipulated variable output instruction unit 117. As a modified example, for example, a plurality of unit manipulated variables Tstep may be stored in the storage unit 108 or the like. Under various conditions, a predetermined unit manipulated variable Tstep may be selected from the plurality of unit manipulated variables Tstep for output.

For example, a first unit manipulated variable Tstep1 and a second unit manipulated variable Tstep2 larger than the first unit manipulated variable Tstep1 are stored in the storage unit 108 or the like. Subsequently, the target determination unit 123 determines whether the measured temperature Tobj falls within the second target temperature range larger than the first target temperature range.

When it is determined that the measured temperature Tobj does not fall within the first target temperature range and falls within the second target temperature range, the manipulated variable output instruction unit 117 gives an instruction to output the first unit manipulated variable Tstep1. Further, when it is determined that the measured temperature Tobj does not fall within the first target temperature range and does not fall within the second target temperature range, the manipulated variable output instruction unit 117 gives an instruction to output the second unit manipulated variable Tstep2.

So, in the case where the measured temperature Tobj is largely different from the target temperature Ttarget (in a state where the measured temperature Tobj does not fall within the second target temperature range), the larger value, i.e., the second unit manipulated variable Tstep2, is output. On the other hand, in the case where the measured temperature Tobj is close to the target temperature Ttarget to some extent (in a state where the measured temperature Tobj falls within the second target temperature range), the smaller value, i.e., the first unit manipulated variable Tstep1, is output. In such a manner, the unit manipulated variable Tstep may be selected and output as appropriate. Thus, it is possible to effectively control the measured temperature Tobj to be the target temperature Ttarget.

It should be noted that the unit manipulated variable Tstep that is output in Steps 118 and 119 of FIG. 6 is set as a settling unit manipulated variable and the unit manipulated variable Tstep that is output in Steps 124 and 125 of FIG. 7 is set as a non-settling unit manipulated variable. In this case, unit manipulated variables Tstep that are equal to each other may be set as the settling unit manipulated variable and the non-settling unit manipulated variable. Alternatively, unit manipulated variables Tstep that are different from each other may be set as the settling unit manipulated variable and the non-settling unit manipulated variable. Further, a plurality of unit manipulated variables Tstep may be set for each of the settling unit manipulated variable and the non-settling unit manipulated variable. The settling unit manipulated variable and the non-settling unit manipulated variable are set as appropriate, and thus fine temperature control can be performed.

Examples of the first and second target temperature ranges, the plurality of settling unit manipulated variables, and the plurality of non-settling unit manipulated variables are shown below.

First target temperature: the range of ±0.4° C. centering on the target temperature Second target temperature: the range of ±1° C. centering on the target temperature First settling unit manipulated variable: 0.1° C.

Second settling unit manipulated variable: 0.2° C.

First non-settling unit manipulated variable: 0.1° C.

Second non-settling unit manipulated variable: 0.3° C.

Such settings described above can be made, for example. With reference to the set temperature Tset of the graph of FIG. 8, an update with the unit manipulated variable of 0.1° C. is executed in many cases. In a range denoted by reference symbol B, an update with the unit manipulated variable of 0.3° C. is executed. In the example of FIG. 8, the settings described in the paragraph immediately above are made, and in the range B, the second non-settling unit manipulated variable is output.

As described above, in the temperature control system 500 and the information processing apparatus 100 according to this embodiment, the amount of temporal change of the measured temperature Tobj of the measurement point A is determined. Based on a result of the determination, the instruction to output the manipulated variable by the manipulated variable output unit 118 is given. At that time, the instruction to output the unit manipulated variable Tstep with a predetermined manipulated variable as a unit is given. With this operation, the output for each unit manipulated variable Tstep can be executed for the chiller 33 whose operation is in a settled state. As a result, the temperature control mechanism 30 and the chiller 33 can be stably controlled.

For example, it is conceived that a temperature regulator such as a chiller is disposed in the temperature control system 500 and the temperature regulator is controlled from the outside. The temperature regulator has a different transfer function and the like depending on a manufactured device, and the specifications for internal control thereof are not disclosed in many cases. So, the control is performed while a response remains obscure, and thus it is difficult to perform stable control without oscillation in simple PID (proportional-integral-derivative) control.

To eliminate this problem, in the present disclosure, a settling determination on whether a result of chiller control is stabilized at a temperature observation point is performed, and the set temperature is updated for each of the unit manipulated variables. This allows the temperature regulator to be stably controlled.

Further, in various temperature regulators of different manufacturers, substantially the same control allows temperature control providing rapid convergence and allows temperature control of an object such as a laser light source to be stably executed at high speed. As a result, this can achieve shortening of a necessary rising time, stable drive, and long service life of the laser light source serving as an object. As a matter of course, the present disclosure is also applicable to temperature control for another device other than the laser light source. Further, the present disclosure is also applicable to another temperature regulator other than a Peltier module (TEC), for example.

Figure 9:
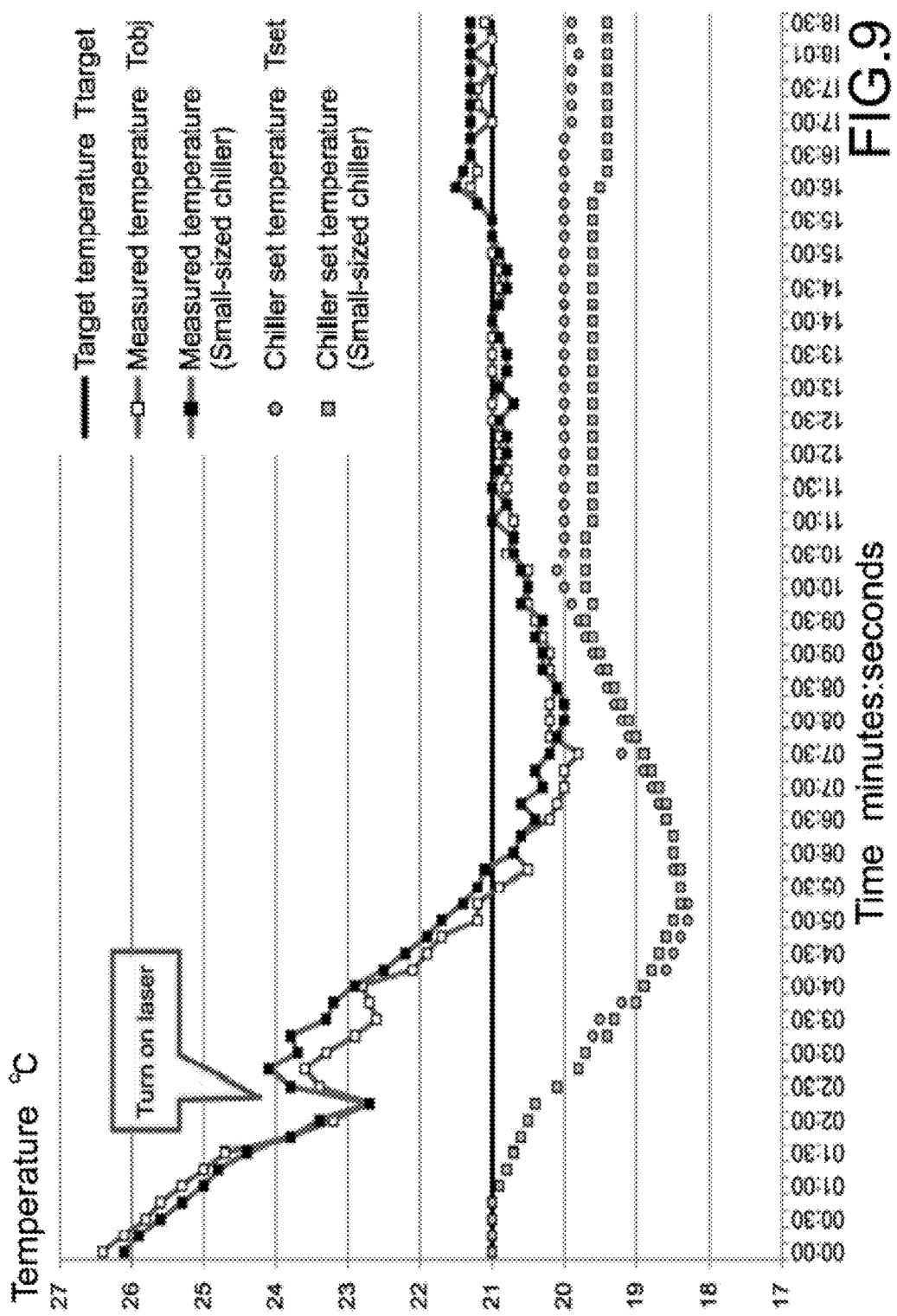
FIG. 9 is a graph showing a measured temperature and a set temperature in the case where another chiller is used.

FIG. 9 is a graph showing a measured temperature and a set temperature in the case where another chiller is used. This graph is created so as to be comparable to the graph of FIG. 8. As another chiller, a small-sized chiller having small power and a small flow rate of a heat medium is used.

As shown in the graph of FIG. 9, as a result of controlling the small-sized chiller by the information processing method (algorithm) described above, stable control is achieved in the same converging accuracy and time. In other words, the temperature of the laser light source can be controlled to be 21° C. in about ten minutes without causing hunting or the like. In such a manner, the present disclosure is also applicable to another temperature regulator adequately.

Second Embodiment

Description will be given on an information processing apparatus according to a second embodiment of the present disclosure. In the following description, the same configurations and actions as those of the temperature control system 500 and the information processing apparatus 100 described in the above embodiment are not described or simply described.

In this embodiment, as compared to the first embodiment, control when the laser light is output is different. So, description will be given focusing on this point. Further, in this embodiment, control when the output of the laser light is stopped will also be described.

Figure 10:
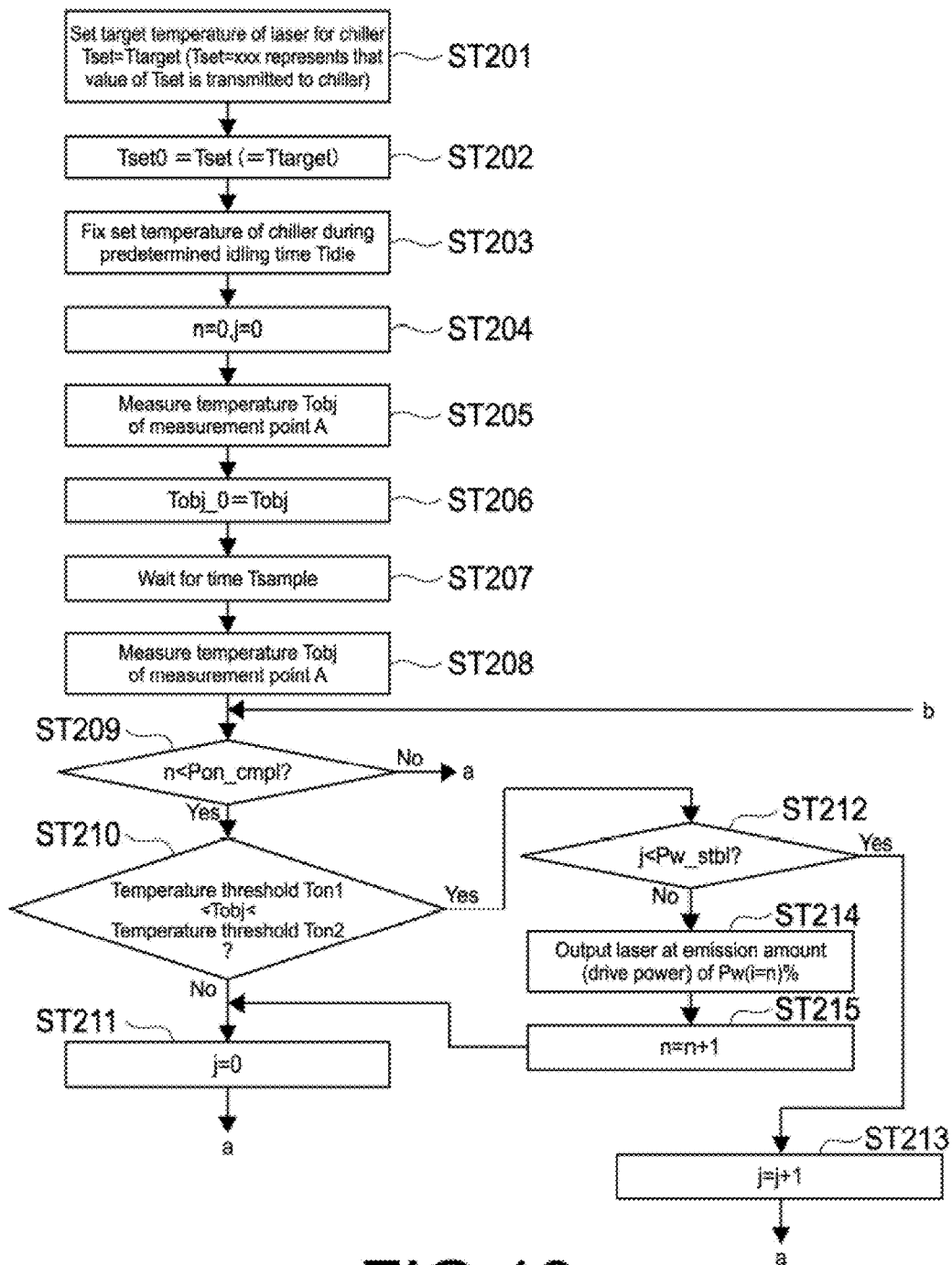
FIG. 10 is a flowchart showing an operation example when outputting laser light according to a second embodiment.
Figure 11:
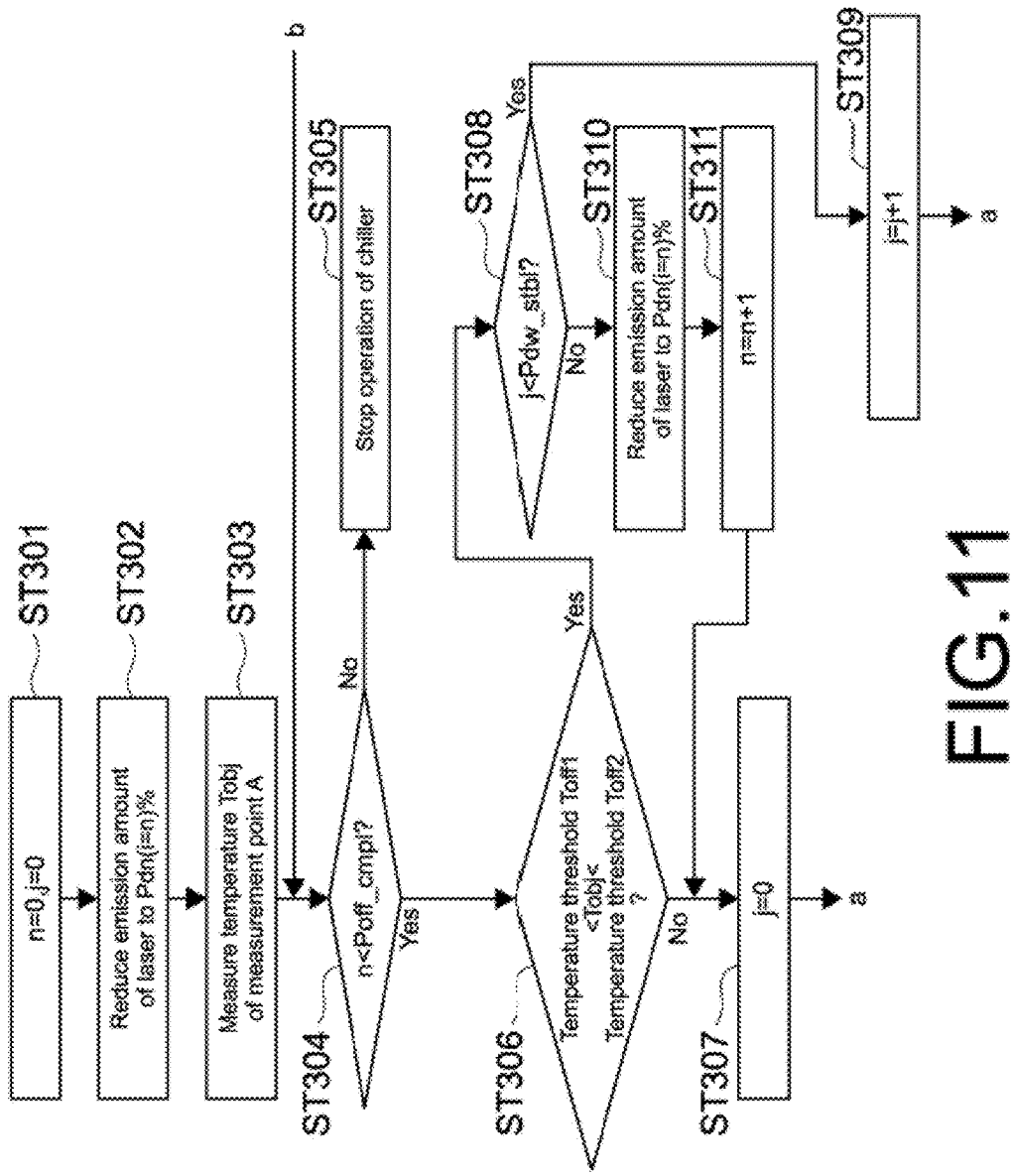
FIG. 11 is a flowchart showing an operation example when stopping the output of the laser light according to the second embodiment.
Figure 12:
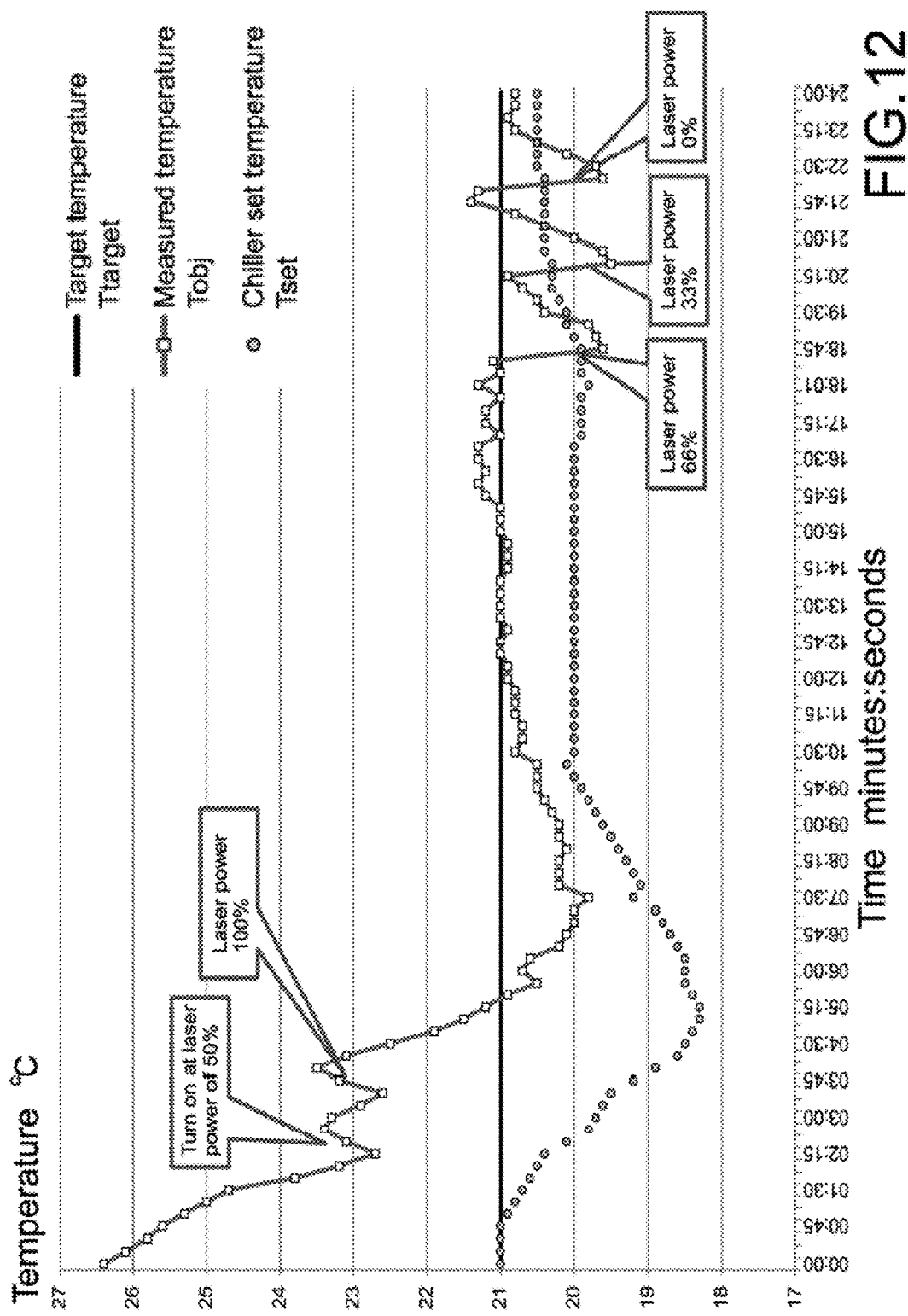
FIG. 12 is a graph showing values of a measured temperature and a set temperature of a chiller in accordance with time, according to the second embodiment.

FIG. 10 is a flowchart showing an operation example of the information processing apparatus when outputting laser light according to this embodiment. FIG. 11 is a flowchart showing an operation example when stopping the output of the laser light. FIG. 12 is a graph showing values of a measured temperature and a set temperature of a chiller in accordance with time.

As shown in the graph of FIG. 12, in this embodiment, at the start of the operation of the laser light source, laser light is output in a stepwise manner such that power increases in a stepwise manner toward predetermined laser power (predetermined output). As shown in FIG. 12, with the predetermined laser power as 100%, laser light at power of 50% is first output. Subsequently, laser light at power of 100% is output. So, in this embodiment, the laser light is output in two stages.

With reference to the flowchart of FIG. 10, in Step 204, the following settings are made: n=0; and j=0. Processing in Steps 201 to 203 and Steps 205 to 208 are the same as the processing of Steps 101 to 107 of FIG. 5.

In Step 209, it is determined whether a value of n is smaller than Pon_cmpl or not. Pon_cmpl is a preset value, and the number of stages before the laser power reaches 100% is set therefor. In this embodiment, Pon_cmpl is preset to 2. When it is determined that the value of n is larger than Pon_cmpl (No of Step 209), it is determined that the laser light is already emitted and thus the processing shown in FIG. 6 is executed.

When it is determined that the value of n is smaller than Pon_cmpl (Yes of Step 209), it is determined whether the measured temperature Tobj falls within a start temperature range (Step 210). When it is determined that the measured temperature Tobj does not fall within the start temperature range (No of Step 210), is set to 0 (Step 211) and the processing shown in FIG. 6 is executed.

When it is determined that the measured temperature Tobj falls within the start temperature range, it is determined whether a value of j is smaller than Pw_stbl or not (Step 212). Pw_stbl is a preset value and is a value for determining whether the measured temperature Tobj is stable or not based on the number of times the measured temperature Tobj successively falls within the start temperature range. For example, even when the measured temperature Tobj temporarily falls within the start temperature range, if the measured temperature Tobj fluctuates out of the range, it is dangerous to output the laser light. So, in this embodiment, in the case where the measured temperature Tobj falls within the start temperature range successively by certain times, power wattage (laser drive power) is switched, and the laser light is output. Alternatively, laser power is increased.

So, Pw_stbl is the number for determining whether the output of the laser light or the increase of the laser power is executed, based on the number of times the measured temperature Tobj falls within the start temperature range. Pw_stbl is set as appropriate, and thus stable temperature control is achieved. Pw_stbl may be set based on the characteristics of the laser light source or the chiller, the sampling time Tsample, and the like. For example, in the case where the sampling time Tsample is 15 seconds, Pw_stbl is set to 2.

When it is determined that the value of j is smaller than Pw_stbl (Yes of Step 212), it is determined that the measured temperature Tobj does not yet fall within the start temperature range successively by predetermined times. Subsequently, j is set to j+1 (Step 213) and the processing shown in FIG. 6 is executed.

When it is determined that the value of j is larger than Pw_stbl (No of Step 212), it is determined that the measured temperature Tobj falls within the start temperature range successively by predetermined times. Subsequently, the laser light is output at laser power (emission amount or drive power) of Pw(i=n)% (Step 214). It should be noted that for Pw(i=n)%, Pw(i=0)=50[%] and Pw(i=1)=100[%]. In other words, the output of the laser light in an (n+1)-th stage is executed.

When the laser light is output, n is set to n+1 (Step 215), and j is set to j+1 in Step 211. Subsequently, the processing shown in FIG. 6 is executed.

In such a manner, the laser light may be output in a stepwise manner. This can prevent a problem resulting from a temperature rise at the start of the operation of the laser light source from occurring.

As shown in the graph of FIG. 12, in this embodiment, at the stop of the operation of the laser light source, the output of laser light is stopped in a stepwise manner such that the laser power decreases in a stepwise manner. As shown in FIG. 12, with the predetermined laser power as 100%, the laser power is first reduced to 66%. Subsequently, the laser power is reduced to 33%, and finally reduced to 0%. So, in this embodiment, the output of the laser light is stopped in three stages.

In Step 301 of FIG. 11, n and j are each set to 0. The emission amount of the laser light is reduced to Pdn(i=n)% (Step 302). It should be noted that Pdn(i=0)=66[%] and Pdn(i=1)=33[%]. Further, Pdn(i=2)=0[%]. In other words, the reduction of the laser power in an (n+1)-th stage is executed.

In Step 303, after the temperature Tobj of the measurement point A is measured, it is determined whether the value of n is smaller than Poff_cmpl or not (Step 304). Poff_cmpl is a preset value, and the number of stages before the laser power is reduced to 0% is set therefor. In this embodiment, Poff_cmpl is preset to 3. When it is determined that the value of n is larger than Poff_cmpl (No of Step 304), it is determined that the output of the laser light is already stopped, and the operation of the chiller is stopped (Step 305).

When it is determined that the value of n is smaller than Poff_cmpl (Yes of Step 304), the stop determination unit 126 of FIG. 4 determines whether the measured temperature Tobj falls within a stop temperature range appropriate to the stop of the operation of the laser light source (Step 306). A temperature threshold Toff1 and a temperature threshold Toff2 shown in Step 306 are a lower limit value and an upper limit value of the stop temperature range, respectively.

As shown in the graph of FIG. 12, immediately after the output of the laser light is stopped or the laser power is shut down, the measured temperature Tobj instantaneously drops. Depending on a relative humidity of room temperature or the like, when the temperature of the laser light source is too low, condensation may occur, which is problematic. So, in this embodiment, the stop temperature range is set as appropriate such that the temperature presents no problems even when the temperature drops at the stop of the operation.

A specific value of the stop temperature range is not limited and may be set as appropriate in accordance with the characteristics of the laser light source and the like. For example, a range close to the target temperature is set as the stop temperature range. It should be noted that when only the lower limit value is set and the measured temperature Tobj exceeds that lower limit value, it may be determined that this state is appropriate to the reduction of the laser power. Comparing the above-mentioned first target temperature range and the stop temperature range, typically, the first target temperature range falls within the stop temperature range. However, the present disclosure is not limited to the above.

In Step 302 of FIG. 11, the laser power is reduced without determination by the stop determination unit 126. This is because the fact that the measured temperature Tobj is already controlled to be the target temperature Ttarget is assumed. However, the reduction of the laser power in a first stage may be executed based on the determination by the stop determination unit 126. In this case, the flow excluding Step 302 only needs to be executed.

When it is determined that the measured temperature Tobj does not fall within the stop temperature range (No of Step 306), j is set to 0 (Step 307) and the processing shown in FIG. 6 is executed.

When it is determined that the measured temperature Tobj falls within the stop temperature range (Yes of Step 306), it is determined whether the value of j is smaller than Pdw_stbl or not (Step 308). Pdw_stbl is a preset value and is a value for determining whether the measured temperature Tobj is stable or not based on the number of times the measured temperature Tobj successively falls within the stop temperature range. Pdw_stbl is set as appropriate, and thus stable temperature control is achieved. Pdw_stbl may be set based on the characteristics of the laser light source or the chiller, the sampling time Tsample, and the like. For example, in the case where the sampling time Tsample is 15 seconds, Pdw_stbl is set to 3.

When it is determined that the value of j is smaller than Pdw_stbl (Yes of Step 308), it is determined that the measured temperature Tobj does not yet fall within the stop temperature range successively by predetermined times. Subsequently, j is set to j+1 (Step 309) and the processing shown in FIG. 6 is executed.

When it is determined that the value of j is larger than Pdw_stbl (No of Step 308), it is determined that the measured temperature Tobj falls within the stop temperature range successively by predetermined times. Subsequently, the emission amount of the laser light is reduced to Pdn (i=n)% (Step 310).

When the laser power is reduced, n is set to n+1 (Step 311), and j is set to j+1 in Step 307. Subsequently, the processing shown in FIG. 6 is executed. In the case where the processing proceeds from the flow of FIG. 11 to the flow of FIG. 6, a value immediately before the stop of the laser light is executed is set for the value of the measured temperature Tobj_0 in Step 114.

In such a manner, in this embodiment, when laser emission is stopped (laser is turned off) from a laser-emitted state, the output (emission amount) of the laser is slightly reduced. When the measured temperature Tobj becomes close to the target temperature Ttarget due to the temperature control by the chiller (or after a certain period of time), the laser power is further reduced. This processing is executed in a stepwise manner. This can prevent the temperature from being decreased too much and condensation from occurring. Additionally, this can prevent a problem resulting from a temperature drop at the stop of the operation from occurring.

Other Embodiments

The present disclosure is not limited to the embodiments described above and can achieve various other embodiments.

In the above description, the measurement point is set at one portion of the laser light source that is an object to be temperature-controlled. Instead of this, the measurement point may be set at a portion having a thermal correlation with the laser light source. For example, a portion thermally connected to the laser light source may be conceived. In the example shown in FIG. 1, a predetermined portion of the pipe 32 to be a flow channel of the heat medium 31 may be set as the measurement point A. An optional portion of the pipe 32, such as a portion closer to the chiller 33 and an intermediate portion between the chiller 33 and the laser light source 41, may become the measurement point A. Further, the discharge temperature, an inflow temperature (the temperature of the heat medium 31 returning back to the chiller 33), or the like of the heat medium 31 may be set as the temperature of the measurement point A. With the measurement point A set as described above, the temperature of the object can be controlled properly. Further, the degree of freedom in design is increased, and downsizing or the like of the apparatus can be achieved.

In the second embodiment, the control to stop outputting the laser light in a plurality of stages has been described. However, the output of the laser light may be stopped in one stage. For example, it is determined whether the measured temperature falls within the stop temperature range once or successively by a plurality of times. When a result of the determination is Yes, the laser power may be reduced to 0%.

In the output control of the laser light in a multi-stage system and the stop control of the output of the laser light in a multi-stage system, the number of stages is not limited and may be set as appropriate.

In the above description, the apparatus disposed separately from the projector has been described as the information processing apparatus. However, the information processing apparatus 100 and the projector 40 shown in FIG. 1 may be integrally configured. For example, the CPU or the like of the projector may achieve a controller that can execute the information processing method according to an embodiment of the present disclosure. In other words, the software blocks shown in FIGS. 3 and 4 may be configured within the projector. In this case, the projector functions as an information processing apparatus and an image display apparatus according to an embodiment of the present disclosure.

It should be noted that the apparatus that is an object to be temperature-controlled is not limited to the image display apparatus such as the projector. Each of various mechanisms of various apparatuses may be an object to be temperature-controlled. Further, a controller that can execute the information processing method according to an embodiment of the present disclosure may be provided to the inside of the object.

It should be noted that the effects disclosed herein are merely examples and are not limited, and other effects may be produced. The above description on the effects does not necessarily mean that those effects are exerted at the same time, but means that at least any of the effects described above is produced depending on conditions and the like. As a matter of course, effects that are not disclosed herein may be produced.

Of the features of the embodiments described above, at least two of the features can be combined. In other words, various features described in the respective embodiments may be optionally combined without distinction of embodiments.

It should be noted that the present disclosure can have the following configurations.

(1) An information processing apparatus, including:

an input unit configured to input a measured temperature that is a measured value of a temperature of a measurement point;

an output unit configured to output a manipulated variable to a temperature control mechanism configured to control the temperature of the measurement point to be a set temperature, the manipulated variable being used for controlling the set temperature;

a change amount determination unit configured to determine an amount of temporal change of the input measured temperature; and an instruction unit configured to instruct the output unit to output a unit manipulated variable with a predetermined manipulated variable as a unit, based on a determination by the change amount determination unit.

(2) The information processing apparatus according to (1), in which the change amount determination unit is configured to determine whether the amount of temporal change falls within a predetermined range, and the instruction unit is configured to give an instruction to output the unit manipulated variable when it is determined that the amount of temporal change falls within the predetermined range.

(3) The information processing apparatus according to (1) or (2), further including a comparison unit configured to compare the measured temperature with a target temperature, in which the instruction unit is configured to give an instruction to output a decreasing unit manipulated variable for decreasing the set temperature when the measured temperature is higher than the target temperature, and to give an instruction to output an increasing unit manipulated variable for increasing the set temperature when the measured temperature is lower than the target temperature.

(4) The information processing apparatus according to any one of (1) to (3), further including a target determination unit configured to determine whether the measured temperature falls within a first target temperature range with the target temperature as a reference, in which the instruction unit is configured to give an instruction to output the unit manipulated variable when it is determined that the measured temperature does not fall within the first target temperature range.

(5) The information processing apparatus according to (4), further including a storage unit configured to store a first unit manipulated variable and a second unit manipulated variable larger than the first unit manipulated variable, in which the target determination unit is configured to determine whether the measured temperature falls within a second target temperature range with the target temperature as a reference, the second target temperature range being larger than the first target temperature range, and the instruction unit is configured to give an instruction to output the first unit manipulated variable when it is determined that the measured temperature does not fall within the first target temperature range and falls within the second target temperature range, and to give an instruction to output the second unit manipulated variable when it is determined that the measured temperature does not fall within the first target temperature range and does not fall within the second target temperature range.

(6) The information processing apparatus according to any one of (3) to (5), further including an increase and decrease determination unit configured to determine a temporal increase and decrease of the measured temperature, in which the instruction unit is configured to give an instruction to output the decreasing unit manipulated variable when the measured temperature increases with time in a state of being higher than the target temperature, and to give an instruction to output the increasing unit manipulated variable when the measured temperature decreases with time in a state of being lower than the set temperature.

(7) The information processing apparatus according to any one of (1) to (6), in which the instruction unit is configured to give no instruction to output the unit manipulated variable before a predetermined period of time elapses after the temperature control mechanism starts to operate.

(8) The information processing apparatus according to any one of (1) to (7), in which the measurement point is set at a portion having a thermal correlation with an object to be temperature-controlled.

(9) The information processing apparatus according to (8), in which the measurement point is set at one portion of the object.

(10) The information processing apparatus according to (8) or (9), in which the temperature control mechanism includes a heat medium capable of exchanging heat with the object, and a chiller configured to control a temperature of the heat medium, and the output unit is configured to output the manipulated variable to the chiller.

(11) The information processing apparatus according to any one of (8) to (10), further including:

a start controller configured to control a start of an operation of the object; and a start determination unit configured to determine whether the measured temperature falls within a start temperature range that is a reference of the start of the operation of the object, in which the start controller is configured to start the operation of the object when it is determined that the measured temperature falls within the start temperature range.

(12) The information processing apparatus according to (11), in which the object is capable of operating at a predetermined output, and the start controller is configured to start the operation of the object in a stepwise manner, to increase an output toward the predetermined output in the stepwise manner.

(13) The information processing apparatus according to any one of (8) to (12), further including:

a stop controller configured to control a stop of an operation of the object; and a stop determination unit configured to determine whether the measured temperature falls within a stop temperature range that is a reference of the stop of the operation of the object, in which the stop controller is configured to stop the operation of the object when it is determined that the measured temperature falls within the stop temperature range.

(14) The information processing apparatus according to (13), in which the stop controller is configured to stop the operation of the object in a stepwise manner, to reduce an output in the stepwise manner.

(15) The information processing apparatus according to any one of (1) to (14), in which the input unit is configured to input the measured temperature that is measured at predetermined sampling intervals.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
    circuitry configured to
        input a measured temperature that is a measured value of a temperature at a measurement point;
        output a manipulated variable to a cooling system configured to control the temperature at the measurement point to be a set temperature, the manipulated variable being used for controlling the set temperature;
        determine whether an amount of temporal change of the input measured temperature falls within a first range;
        compare the measured temperature with a target temperature;
        output a unit of the manipulated variable to the cooling system to control the temperature at the measurement point when the amount of temporal change of the input measured temperature is determined to fall within the first range and based on the comparison of the measured temperature with the target temperature; and determine a temporal increase or decrease of the measured temperature, wherein the circuitry is configured to output a decrease unit of the manipulated variable to the cooling system to control the temperature at the measurement point when the measured temperature increases with time in a state of being higher than the target temperature and the amount of temporal change is determined to be outside of the first range, and output an increase unit of the manipulated variable to the cooling system to control the temperature at the measurement point when the measured temperature decreases with time in a state of being lower than the set temperature and the amount of temporal change is determined to be outside of the first range.

2. The information processing apparatus according to claim 1, wherein the circuitry is further configured to determine whether the measured temperature falls within a second range with the target temperature as a reference, and output the unit of the manipulated variable to the cooling system to control the temperature at the measurement point when the measured temperature is determined not to fall within the second range and the amount of temporal change of the input measured temperature is determined to fall within the first range.

3. The information processing apparatus according to claim 2, further comprising a memory configured to store a first unit of the manipulated variable and a second unit of the manipulated variable larger than the first unit of the manipulated variable, wherein the circuitry is configured to determine whether the measured temperature falls within a third range with the target temperature as a reference, the third range being larger than the second range, output the first unit of the manipulated variable when the measured temperature is determined to not fall within the second range and to fall within the third range, and output the second unit of the manipulated variable when the measured temperature is determined to not fall within the second range and to not fall within the third range.

4. The information processing apparatus according to claim 1, wherein the circuitry is configured to not output the unit of the manipulated variable before a predetermined period of time elapses after the cooling system starts to operate.

5. The information processing apparatus according to claim 1, wherein the measurement point is set at a portion having a thermal correlation with an object to be temperature-controlled.

6. The information processing apparatus according to claim 5, wherein the measurement point is set at one portion of the object.

7. The information processing apparatus according to claim 5, wherein the cooling system includes a heat medium configured to exchange heat with the object, and a chiller configured to control a temperature of the heat medium, and the circuitry is configured to output the manipulated variable to the chiller.

8. The information processing apparatus according to claim 5, wherein the circuitry is configured to control a start of an operation of the object, determine whether the measured temperature falls within a fourth range that is a reference of the start of the operation of the object, and start the operation of the object when the measured temperature is determined to fall within the fourth range.

9. The information processing apparatus according to claim 8, wherein the object is capable of operating at a predetermined output, and the circuitry is configured to start the operation of the object in a stepwise manner, to increase an output toward the predetermined output in the stepwise manner.

10. The information processing apparatus according to claim 5, wherein the circuitry is configured to control a stop of an operation of the object, determine whether the measured temperature falls within a fifth range that is a reference of the stop of the operation of the object, and stop the operation of the object when the measured temperature is determined to fall within the fifth range.

11. The information processing apparatus according to claim 10, wherein the circuitry is configured to stop the operation of the object in a stepwise manner, to reduce an output in the stepwise manner.

12. The information processing apparatus according to claim 1, wherein the circuitry is configured to input the measured temperature that is measured at predetermined sampling intervals.

13. The information processing apparatus according to claim 1, wherein the circuitry is configured to output the decrease unit of the manipulated variable for decreasing the set temperature when the amount of temporal change of the input measured temperature is determined to fall within the first range and the measured temperature is higher than the target temperature, and output the increase unit of the manipulated variable for increasing the set temperature when the amount of temporal change of the input measured temperature is determined to fall within the first range and the measured temperature is lower than the target temperature.

14. An information processing method, comprising:

inputting a measured temperature that is a measured value of a temperature at a measurement point;

determining, by circuitry of an information processing apparatus, whether an amount of temporal change of the input measured temperature falls within a first range;

comparing, by the circuitry, the measured temperature with a target temperature when the amount of temporal change of the input measured temperature is determined to fall within the first range;

determining, by the circuitry, a temporal increase or decrease of the measured temperature when the amount of temporal change of the input measured temperature is determined to be outside the first range;

outputting, by the circuitry, a unit of a manipulated variable to a cooling system to control the temperature at the measurement point when the amount of temporal change of the input measured temperature is determined to fall within the first range and based on the comparison of the measure temperature with the target temperature;

outputting a decrease unit of the manipulated variable to the cooling system to control the temperature at the measurement point when the measured temperature increases with time in a state of being higher than the target temperature and the amount of temporal change is determined to be outside of the first range; and outputting an increase unit of the manipulated variable to the cooling system to control the temperature at the measurement point when the measured temperature decreases with time in a state of being lower than the set temperature and the amount of temporal change is determined to be outside of the first range.

15. A non-transitory computer-readable medium storing a program which when executed by a computer causes the computer to perform an information processing method comprising:

inputting a measured temperature that is a measured value of a temperature at a measurement point;

determining whether an amount of temporal change of the input measured temperature falls within a first range;

comparing the measured temperature with a target temperature when the amount of temporal change of the input measured temperature is determined to fall within the first range;

determining a temporal increase or decrease of the measured temperature when the amount of temporal change of the input measured temperature is determined to be outside the first range;

outputting a unit of a manipulated variable to a cooling system to control the temperature at the measurement point when the amount of temporal change of the input measured temperature is determined to fall within the first range and based on the comparison of the measured temperature with the target temperature;

outputting a decrease unit of the manipulated variable to the cooling system to control the temperature at the measurement point when the measured temperature increases with time in a state of being higher than the target temperature and the amount of temporal change is determined to be outside of the first range, and output an increase unit of the manipulated variable to the cooling system to control the temperature at the measurement point when the measured temperature decreases with time in a state of being lower than the set temperature and the amount of temporal change is determined to be outside of the predetermined range.

16. An image display apparatus, comprising:

an image display including a laser light source;

a sensor configured to measure a temperature at a measurement point that is set at a portion having a thermal correlation with the laser light source; and circuitry configured to input a measured temperature that is a measured value by the sensor; output a manipulated variable to a cooling system configured to control the temperature at the measurement point to be a set temperature, the manipulated variable being used for controlling the set temperature;

determine whether an amount of temporal change of the input measured temperature falls within a first range;

compare the measured temperature with a target temperature;

output a unit of the manipulated variable to the cooling system to control the temperature at the measurement point when the amount of temporal change of the input measured temperature is determined to fall within the first range and based on the comparison of the measured temperature with the target temperature; and determine a temporal increase or decrease of the measured temperature, wherein the circuitry is configured to output a decrease unit of the manipulated variable to the cooling system to control the temperature at the measurement point when the measured temperature increases with time in a state of being higher than the target temperature and the amount of temporal change is determined to be outside of the first range, and output an increase unit of the manipulated variable to the cooling system to control the temperature at the measurement point when the measured temperature decreases with time in a state of being lower than the set temperature and the amount of temporal change is determined to be outside of the first range.

* * * * *